(12) United States Patent
Kupratis et al.

(10) Patent No.: US 12,173,644 B2
(45) Date of Patent: *Dec. 24, 2024

(54) AUGMENTED DRIVE OF COMPRESSORS VIA DIFFERENTIAL AND MULTISTAGE TURBINE

(71) Applicant: RTX CORPORATION, Farmington, CT (US)

(72) Inventors: Daniel Bernard Kupratis, Wallingford, CT (US); Paul R. Hanrahan, Sedona, AZ (US); Arthur M. Salve, Jr., Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,422

(22) Filed: Aug. 2, 2023

(65) Prior Publication Data

US 2024/0018901 A1 Jan. 18, 2024

Related U.S. Application Data

(62) Division of application No. 17/864,982, filed on Jul. 14, 2022, now Pat. No. 11,753,990, which is a
(Continued)

(51) Int. Cl.
*F02C 3/113* (2006.01)
*F02C 3/14* (2006.01)
(Continued)

(52) U.S. Cl.
CPC ............. *F02C 3/113* (2013.01); *F02C 3/14* (2013.01); *F02C 9/56* (2013.01); *F02K 3/10* (2013.01); *F02C 9/00* (2013.01); *F05D 2220/32* (2013.01)

(58) Field of Classification Search
CPC .... F02C 3/113; F02C 3/14; F02C 7/36; F02C 9/00; F02C 9/56; F05D 2260/40311;
(Continued)

(56) References Cited

U.S. PATENT DOCUMENTS 3,673,802 A 7/1972 Krebs
4,132,064 A 1/1979 Kumm
(Continued)

FOREIGN PATENT DOCUMENTS

DE 3933776 4/1991
EP 1936238 6/2008
EP 3748146 12/2020

OTHER PUBLICATIONS

United Kingdom Intellectual Property Office; United Kingdom Office Action dated Apr. 6, 2022 in Application No. GB2013013.4.
(Continued)

*Primary Examiner* — Jason H Duger
(74) *Attorney, Agent, or Firm* — SNELL & WILMER L.L.P.

(57) ABSTRACT

A method of distributing power within a gas turbine engine is disclosed. In various embodiments, the method includes driving a high pressure turbine having a first stage and a second stage with an exhaust stream from a combustor, the first stage connected to a high pressure turbine first stage spool and the second stage connected to a high pressure turbine second stage spool; driving a high pressure compressor connected to a high pressure compressor spool via a differential system, the differential system having a first stage input gear connected to the high pressure turbine first stage spool, a second stage input gear connected to the high pressure turbine second stage spool and an output gear assembly connected to the high pressure compressor spool; and selectively applying an auxiliary input power into at
(Continued)

least one of the high pressure compressor spool and the high pressure turbine.

6 Claims, 13 Drawing Sheets

Related U.S. Application Data division of application No. 16/656,931, filed on Oct. 18, 2019, now Pat. No. 11,421,590.

(60) Provisional application No. 62/890,825, filed on Aug. 23, 2019, provisional application No. 62/890,848, filed on Aug. 23, 2019, provisional application No. 62/890,836, filed on Aug. 23, 2019.

(51) Int. Cl.
  *F02C 9/00* (2006.01)
  *F02C 9/56* (2006.01)
  *F02K 3/10* (2006.01)

(58) Field of Classification Search
  CPC .......... F05D 2220/32; B64D 2027/026; F01D 15/10; F02K 9/10
  See application file for complete search history.

(56) References Cited

U.S. PATENT DOCUMENTS

| | | |
|---|---|---|
| 4,159,624 A | 7/1979 | Gruner |
| 4,251,987 A | 2/1981 | Adamson |
| 5,694,765 A | 12/1997 | Hield |
| 6,895,741 B2 | 5/2005 | Rago et al. |
| 7,513,120 B2 | 4/2009 | Kupratis |
| 7,621,117 B2 * | 11/2009 | Dooley ............... F01D 19/00 60/793 |
| 7,791,235 B2 | 9/2010 | Kern |
| 9,021,778 B2 | 5/2015 | Kupratis |
| 9,200,592 B2 | 12/2015 | Berryann et al. |
| 9,890,704 B2 | 2/2018 | Speak et al. |
| 10,138,817 B2 | 11/2018 | Venter |
| 10,644,630 B2 | 5/2020 | Smith et al. |
| 2013/0259651 A1 | 10/2013 | Kupratis et al. |
| 2013/0259654 A1 | 10/2013 | Kupratis et al. |
| 2014/0150401 A1 | 6/2014 | Venter |
| 2018/0003109 A1 | 1/2018 | Lents et al. |
| 2019/0145322 A1 * | 5/2019 | Sellick ............... F02C 7/36 290/52 |
| 2020/0386188 A1 | 12/2020 | Kupratis |

OTHER PUBLICATIONS

United Kingdom Intellectual Property Office; United Kingdom Search Report dated Jan. 15, 2021 in Application No. GB2013013.4.

USPTO; Notice of Allowance dated May 13, 2022 in U.S. Appl. No. 16/656,931.

USPTO; Corrected Notice of Allowance dated Jun. 9, 2022 in U.S. Appl. No. 16/656,931.

USPTO; Restriction Requirement dated Mar. 3, 2022 in U.S. Appl. No. 16/656,931.

USPTO; Non-Final Office Action dated Oct. 28, 2022 in U.S. Appl. No. 17/864,982.

USPTO; Final Office Action dated Feb. 17, 2023 in U.S. Appl. No. 17/864,982.

USPTO; Advisory Action dated Apr. 19, 2023 in U.S. Appl. No. 17/864,982.

USPTO; Notice of Allowance dated May 15, 2023 in U.S. Appl. No. 17/864,982.

* cited by examiner

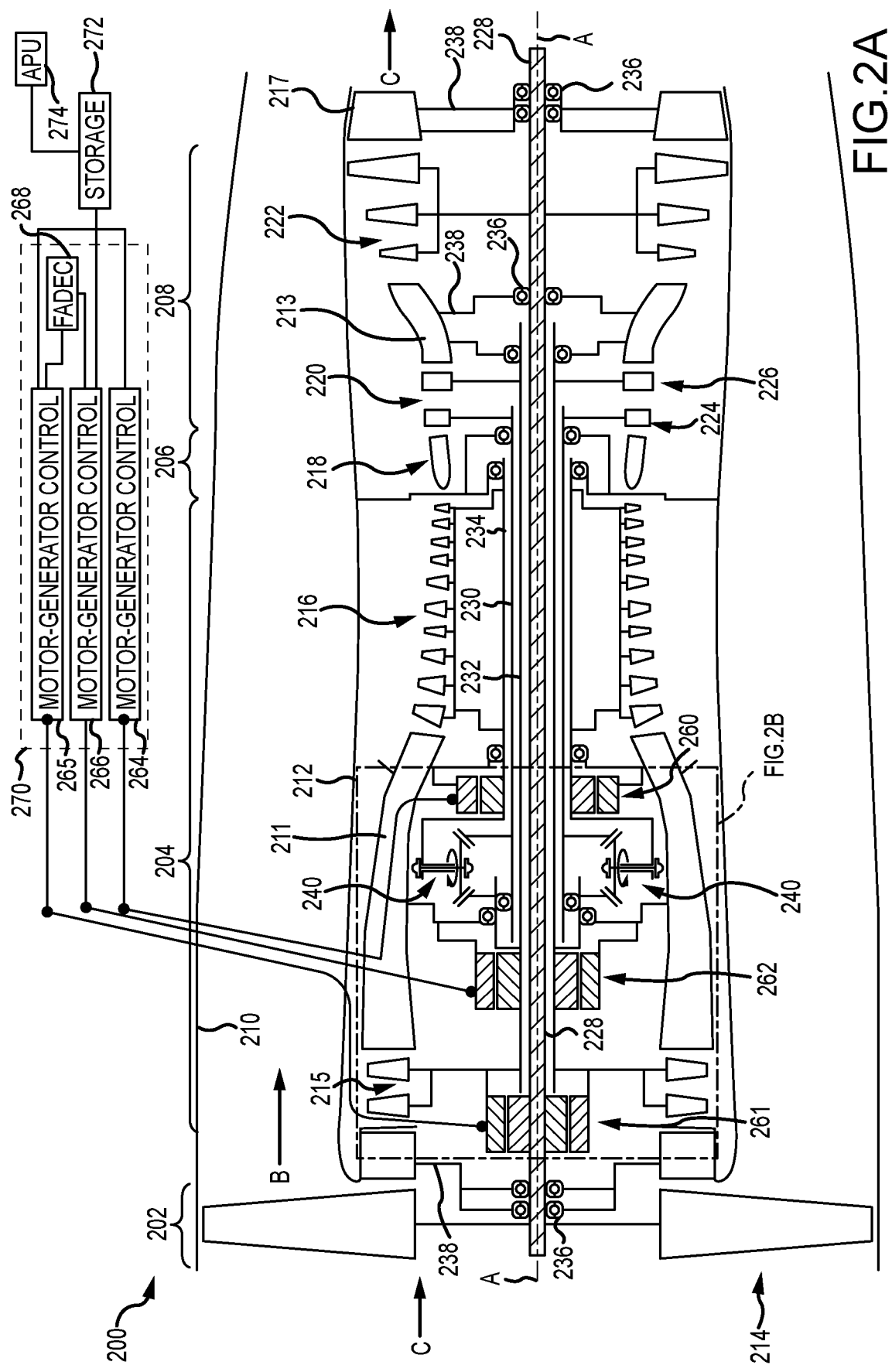

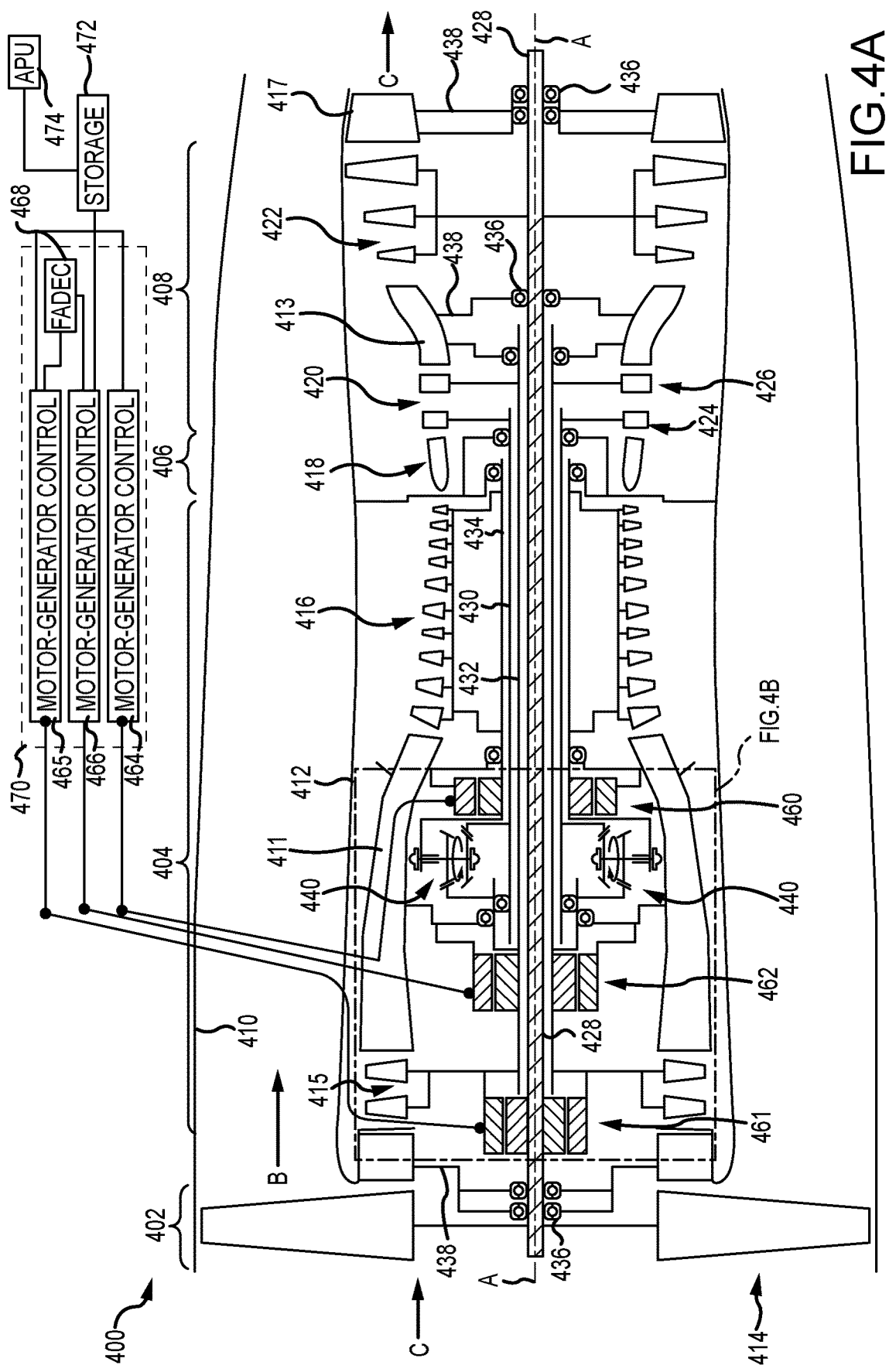

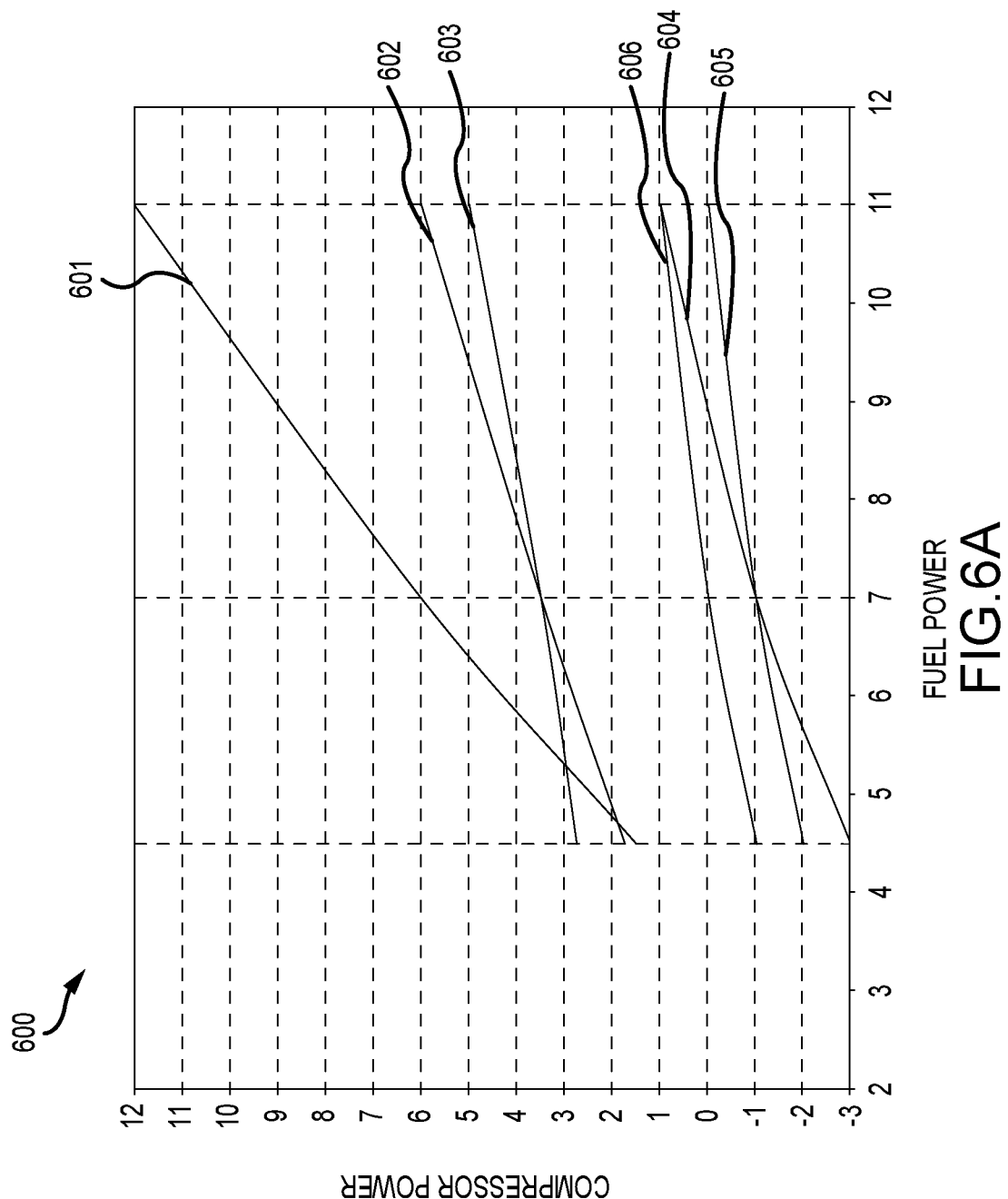

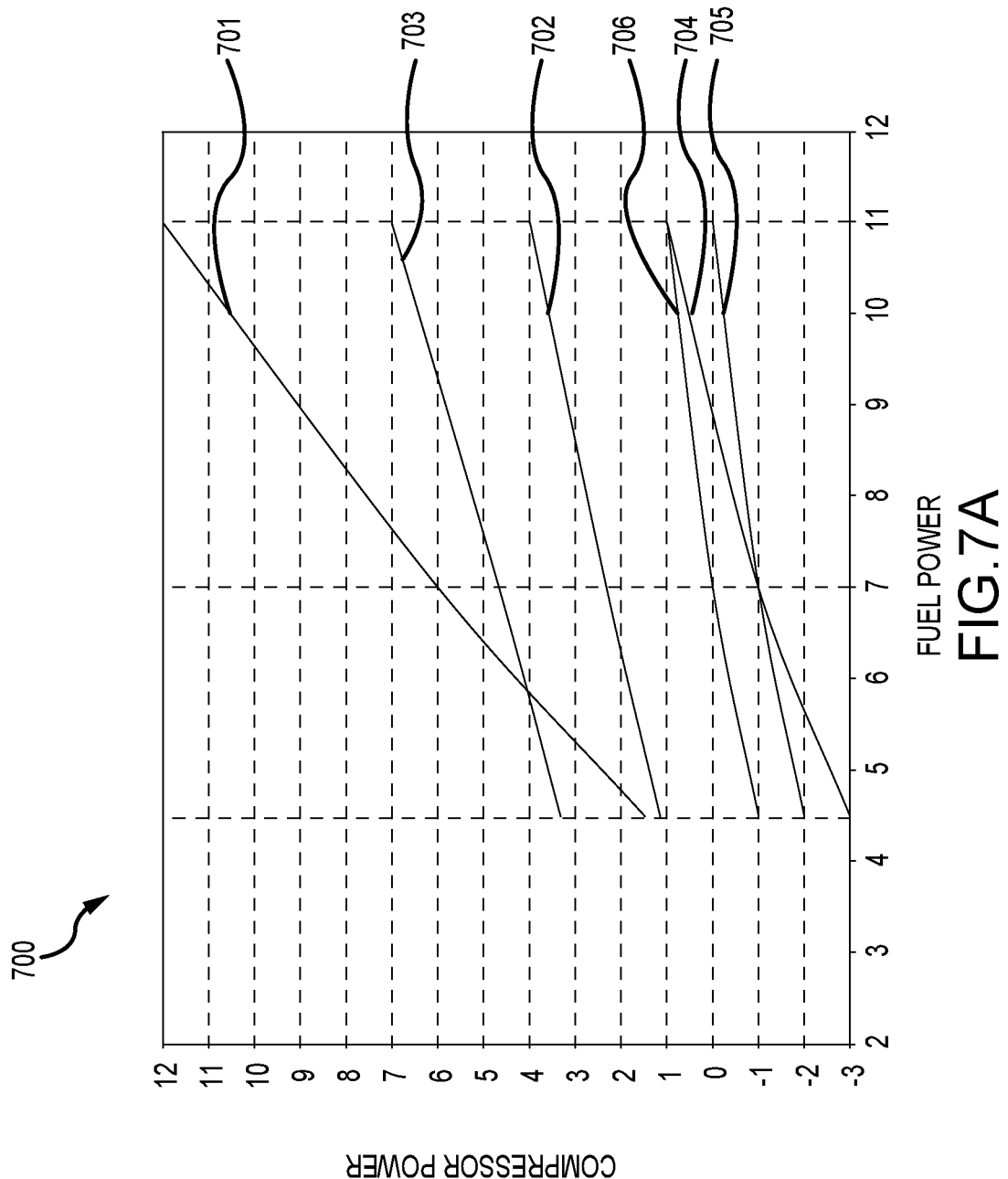

AUGMENTED DRIVE OF COMPRESSORS VIA DIFFERENTIAL AND MULTISTAGE TURBINE

CROSS-REFERENCE TO RELATED APPLICATIONS

This application is a divisional of, and claims priority and the benefit of, U.S. application Ser. No. 17/864,982, entitled "AUGMENTED DRIVE OF COMPRESSORS VIA DIFFERENTIAL AND MULTISTAGE TURBINE," filed Jul. 14, 2022; which is a divisional of, and claims priority and the benefit of, U.S. application Ser. No. 16/656,931, entitled "AUGMENTED DRIVE OF COMPRESSORS VIA DIFFERENTIAL AND MULTISTAGE TURBINE," filed Oct. 18, 2019, now U.S. Pat. No. 11,421,590, issued Aug. 23, 2022; which is a non-provisional application claiming priority to U.S. Prov. Appl. 62/890,825, entitled "AUGMENTED DRIVE OF COMPRESSORS VIA DIFFERENTIAL AND MULTISTAGE TURBINE," filed Aug. 23, 2019; U.S. Prov. Appl. 62/890,836, entitled "MULTISTAGE GAS TURBINE ENGINE WITH TORQUE CONVERTER DRIVE OF COMPRESSOR," filed Aug. 23, 2019; and U.S. Prov. Appl. 62/890,848, entitled "MULTISTAGE GAS TURBINE ENGINE WITH DIFFERENTIAL DRIVE OF COMPRESSOR," filed Aug. 23, 2019, the entirety of each is hereby incorporated by reference herein for all purposes.

FIELD

The present disclosure relates generally to gas turbine engines and, more particularly, to gas turbine engines having a multistage turbine section configured to drive a compressor section.

BACKGROUND

Gas turbine engines typically include a fan section, a compressor section, a combustor section and a turbine section. During operation, air is pressurized in the compressor section and mixed with fuel and burned in the combustor section to generate hot combustion gases. The hot combustion gases are then communicated through the turbine section, where energy is extracted from the hot combustion gases to power the compressor section, the fan section or various other loads developed within or outside the gas turbine engine.

Spools are typically used to connect components of the turbine section with components of the compressor section and the fan section. For example, a low speed spool generally includes an inner shaft that interconnects a fan, a low pressure compressor and a low pressure turbine. The inner shaft may be connected to the fan through a speed change mechanism to drive the fan at a lower speed than that of the low speed spool. A high speed spool generally includes an outer shaft that interconnects a high pressure compressor and a high pressure turbine. The inner shaft and the outer shaft are typically concentric with respect to one another and rotate via bearing systems about a central longitudinal axis, which is collinear with longitudinal axes of both the low and high speed spools.

The high pressure turbine sections of various gas turbine engines have two or more stages. For example, a two-stage high pressure turbine includes a first stage configured to receive the hot combustion gases from the combustor section and a second stage configured to receive the exhaust from the first stage. In such configurations, which may rotate on the order of 20,000 rpm 2100 rad/sec) or greater during operation, the first stage may exhibit lower turbine efficiencies than the second stage. Further, rotational speeds of the second stage may be limited by allowable stress limits within the blades (e.g., maximum centrifugal stress states or $AN^2$ limits). The rotational speed limits placed on the second stage may also impact the efficiency of the high pressure compressor, as its design speed may be greater than the maximum rotational speed of the second stage of the high pressure turbine. Maximizing the competing efficiencies and design speeds of the high pressure compressor and the high pressure turbine, typically connected by a common high speed spool, presents design challenges.

SUMMARY

A method of distributing power within a gas turbine engine is disclosed. In various embodiments, the method includes driving a high pressure turbine having a first stage and a second stage with an exhaust stream from a combustor, the first stage connected to a high pressure turbine first stage spool and the second stage connected to a high pressure turbine second stage spool; driving a high pressure compressor connected to a high pressure compressor spool via a differential system, the differential system having a first stage input gear connected to the high pressure turbine first stage spool, a second stage input gear connected to the high pressure turbine second stage spool and an output gear assembly connected to the high pressure compressor spool; and selectively applying an auxiliary input power into at least one of the high pressure compressor spool and the high pressure turbine.

In various embodiments, the selectively applying the auxiliary input power includes applying a first input power to a first motor-generator connected to the high pressure compressor spool. In various embodiments, the selectively applying the auxiliary input power includes applying a second input power to a second motor-generator connected to the high pressure turbine second stage spool. In various embodiments, the selectively applying the auxiliary input power includes applying a first input power to a first motor-generator connected to the high pressure compressor spool and a second input power to a second motor-generator connected to the high pressure turbine second stage spool.

In various embodiments, the method includes selectively extracting an auxiliary output power from at least one of the high pressure compressor spool and the high pressure turbine. In various embodiments, the selectively extracting the auxiliary output power includes charging a storage device. In various embodiments, the selectively extracting the auxiliary output power includes extracting a first output power from a first motor-generator connected to the high pressure compressor spool. In various embodiments, the selectively extracting the auxiliary output power includes extracting a second output power from a second motor-generator connected to the high pressure turbine second stage spool. In various embodiments, the selectively extracting the auxiliary output power includes extracting a first output power from a first motor-generator connected to the high pressure compressor spool and a second output power from a second motor-generator connected to the high pressure turbine second stage spool.

In various embodiments, the auxiliary input power comprises an electrical power from a storage device. In various embodiments, the auxiliary input power enables a reduced fuel power used to drive the high pressure turbine.

A gas turbine engine is disclosed. In various embodiments, the gas turbine engine includes a turbine having a first stage and a second stage, the first stage connected to a first stage spool and the second stage connected to a second stage spool; a compressor connected to a compressor spool; a differential system having a first stage input gear connected to the first stage spool, a second stage input gear connected to the second stage spool and an output gear assembly connected to the compressor spool; and an augmentation system configured to input power into at least one of the high pressure compressor spool and the high pressure turbine.

In various embodiments, the differential system is configured to drive the compressor spool in response to the first stage spool and the second stage spool rotating at different speeds with respect to a central longitudinal axis. In various embodiments, the differential system is configured to input a first stage spool rotational speed and a second stage spool rotational speed and output a compressor spool rotational speed having a value in between the first stage spool rotational speed and the second stage spool rotational speed. In various embodiments, the differential system is configured to input a first stage spool rotational speed greater than a second stage spool rotational speed and output a compressor spool rotational speed having a value in between the first stage spool rotational speed and the second stage spool rotational speed.

In various embodiments, the augmentation system includes a first motor-generator connected to the compressor spool and a second motor-generator connected to the second stage spool. In various embodiments, the first motor-generator and the second motor-generator each include a stator connected to an engine static structure.

A method for distributing power from a turbine section of a gas turbine engine is disclosed. In various embodiments, the method includes generating a first stage rotational power from a first stage of the turbine section; generating a second stage rotational power from a second stage of the turbine section; inputting into a differential system the first stage rotational power via a first stage spool and the second stage rotational power via a second stage spool; outputting from the differential system a compressor stage rotational power configured to drive a compressor spool of the gas turbine engine; and selectively applying an auxiliary input power into at least one of the compressor spool, the first stage spool and the second stage spool. In various embodiments, the method includes selectively extracting an auxiliary output power from at least one of the compressor spool, the first stage spool and the second stage spool. In various embodiments, the method includes driving a fan via a low pressure turbine of the turbine section.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 2A is a schematic view of a gas turbine engine, in accordance with various embodiments;

FIG. 4A is a schematic view of a gas turbine engine, in accordance with various embodiments;

FIGS. 6A and 6B graphically illustrate a high pressure compressor power versus a high pressure turbine power, in accordance with various embodiments; and FIGS. 7A and 7B graphically illustrate a high pressure compressor power versus a high pressure turbine power, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
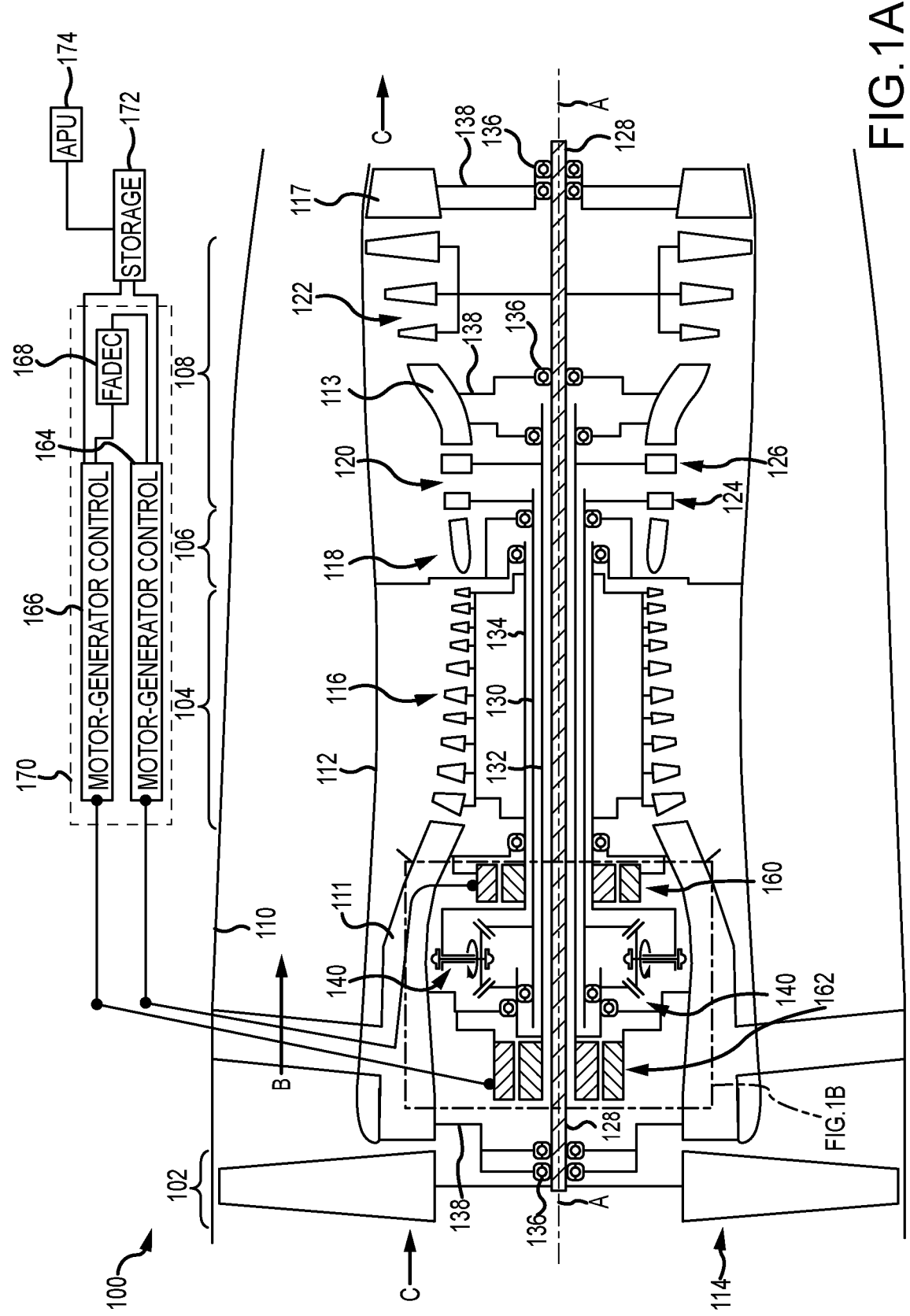
FIG. 1A is a schematic view of a gas turbine engine, in accordance with various embodiments.
Figure 1B:
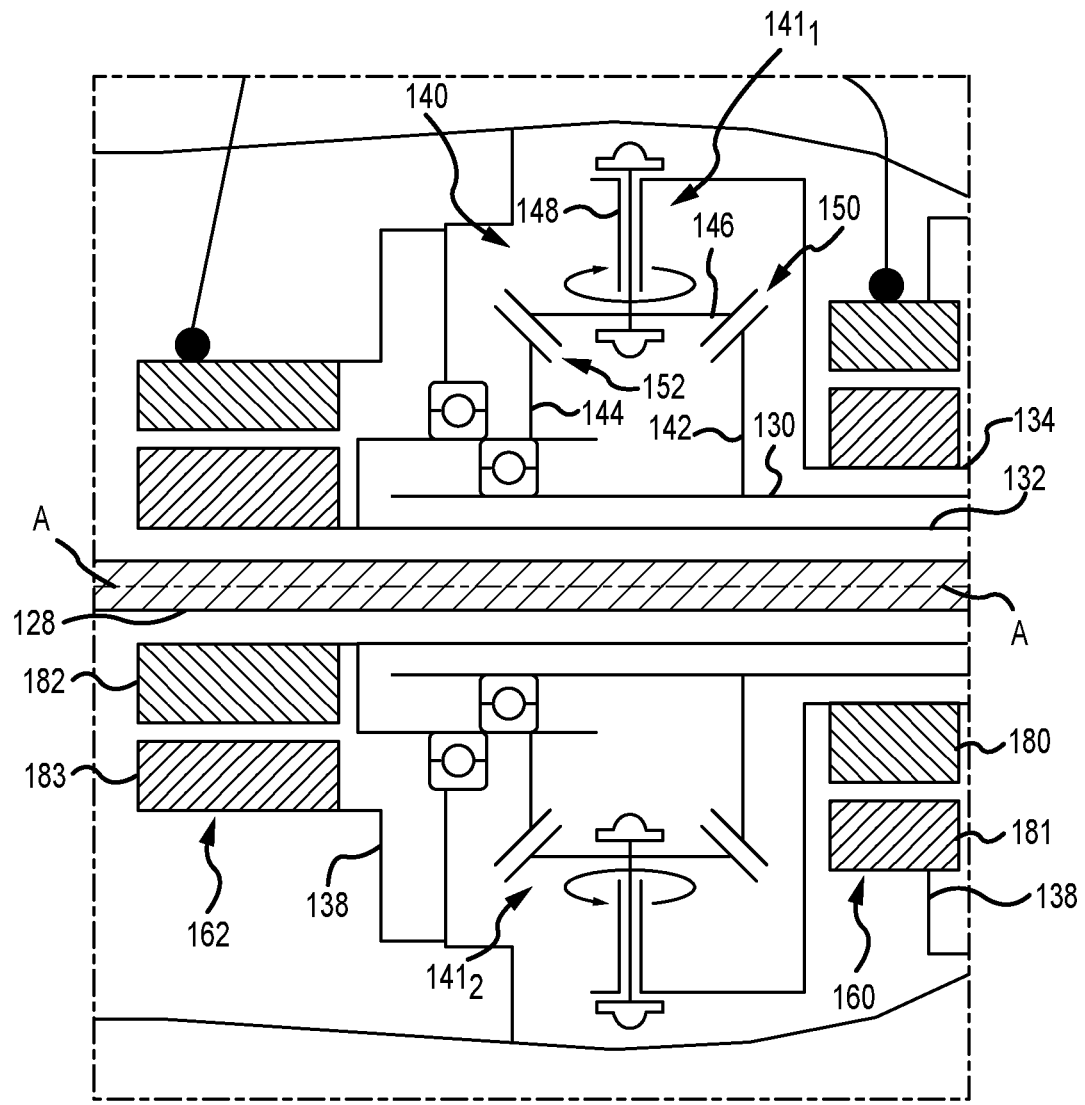
FIG. 1B is a schematic view of a differential system for a gas turbine engine, in accordance with various embodiment.

Referring now to the drawings, FIGS. 1A and 1B schematically illustrates a gas turbine engine 100, in accordance with various embodiments. The gas turbine engine 100 is disclosed herein as a four-spool turbofan engine that generally incorporates a fan section 102, a compressor section 104, a combustor section 106 and a turbine section 108. The fan section 102 drives air along a bypass flow path B in a bypass duct defined by a radially inner surface of a nacelle 110 and a radially outer surface of a core engine case 112, while the compressor section 104 drives air along a core flow path C for compression and communication into the combustor section 106 and then expansion through the turbine section 108. The core flow path C is generally ducted through a core duct, which may be defined by the compressor, combustor and turbine sections, radially inward of the core engine case 112. The core duct may also be defined, in part, by a forward strut 111, an intermediate strut 113 and an exit strut 117, each of which may also function as a vane or duct and be formed as part of or connected to a fixed structure for various of the rotating components of the gas turbine engine 100.

More specifically, the fan section 102 includes a fan 114, the compressor section 104 includes a high pressure compressor 116, the combustor section 106 includes a combustor 118 and the turbine section 108 includes a high pressure turbine 120 and a low pressure turbine 122. Further, the high pressure turbine 120 includes a first stage 124 and a second stage 126 disposed downstream of the first stage 124. In general, air in the core flow path C is compressed by the high pressure compressor 116, mixed and burned with fuel in the combustor 118, and then expanded over the high pressure turbine 120 and the low pressure turbine 122, with the high pressure turbine 120 and the low pressure turbine 122 being configured, as described below, to drive the high pressure compressor 116 and the fan 114.

Still referring to FIGS. 1A and 1B, in various embodiments, the gas turbine engine 100 includes a low speed spool 128, a high pressure turbine first stage spool 130 (or a first stage spool), a high pressure turbine second stage spool 132 (or a second stage spool) and a high pressure compressor spool 134 (or a compressor spool). Each of the spools is generally situated within a bearing assembly 136, components of which are housed within or connected to an engine static structure 138, and configured to rotate coaxially with respect to a central longitudinal axis A. The low speed spool 128 is configured to connect the fan 114 to the low pressure turbine 122. While the low speed spool 128 is illustrated as directly connecting the fan 114 and the low pressure turbine 122, it will be appreciated that various intervening drive systems, such as, for example, a fan drive gear system may be incorporated into the gas turbine engine 100 such that the fan 114 rotates at a lower speed than does the low speed spool 128. The high pressure turbine first stage spool 130 and the high pressure turbine second stage spool 132 are configured to drive the high pressure compressor 116, which is mounted on the high pressure compressor spool 134, via a differential system 140.

In addition, the gas turbine engine 100 includes an augmentation system which, in various embodiments, may include one or more motor-generators configured to input power to or extract power from various of the spools within the gas turbine engine 100. For example, in various embodiments, a first motor-generator 160 is connected to the high pressure compressor spool 134 and a second motor-generator 162 is connected to the high pressure turbine second stage spool 132. In various embodiments, the first motor-generator 160 may comprise an armature 180 that is connected to the high pressure compressor spool 134 and a stator 181 that is connected to the engine static structure 138. Similarly, in various embodiments, the second motor-generator 162 may comprise an armature 182 that is connected to the high pressure turbine second stage spool 132 and a stator 183 that is connected to the engine static structure 138. The first motor-generator 160 is connected to and controlled by a first controller 164 and the second motor-generator 162 is connected to and controlled by a second controller 166. In various embodiments, the first controller 164 and the second controller 166 are further controlled by a full authority digital electric controller or FADEC 168. While the first controller 164, the second controller 166 and the FADEC 168 are illustrated as individual components, the disclosure contemplates control of the first motor-generator 160 and the second motor-generator 162 being accomplished by a controller 170, which may be considered to include combined functionalities of one or more of the first controller 164, the second controller 166 and the FADEC 168. In various embodiments, an energy storage device 172 is also included within the gas turbine engine 100. The energy storage device 172 may comprise, for example, a battery, a capacitor or any similar rechargeable energy storage component. In various embodiments, the energy storage device 172 may also comprise or be connected to an auxiliary source of power, such as, for example, an auxiliary power unit or APU 174.

In various embodiments, the controller 170 is configured to monitor and control operation of the first motor-generator 160 and the second motor-generator 162, based on whether one or both of the motor-generators are required to drive the spool to which it is attached, to generate power for storage in the energy storage device 172 or to carry out load-sharing between the various spools and the components attached thereto. For example, in various embodiments, the first motor-generator 160 may be employed to increase (or maintain) the rotational speed of the high pressure compressor spool 134 by providing power to the first motor-generator 160 (i.e., the motor-generator is being used as a motor). In various embodiments, the first motor-generator 160 may also be employed to decrease (or maintain) the rotational speed of the high pressure compressor spool 134 by extracting power from the first motor-generator 160 (i.e., the motor-generator is being used as a generator). Similarly, in various embodiments, the second motor-generator 162 may be employed to increase (or maintain) the rotational speed of the high pressure turbine second stage spool 132 by providing power to the second motor-generator 162 (i.e., the motor-generator is being used as a motor). In various embodiments, the second motor-generator 162 may also be employed to decrease (or maintain) the rotational speed of the high pressure turbine second stage spool 132 by extracting power from the second motor-generator 162 (i.e., the motor-generator is being used as a generator).

Referring more specifically, to FIG. 1B, the differential system 140 includes a first stage input gear 142, a second stage input gear 144 and an output gear 146, where the first stage input gear 142 and the second stage input gear 144 are sized the same (e.g., the gears share the same number of teeth and the same radius). As illustrated, the first stage input gear 142 is connected to and rotates with the high pressure turbine first stage spool 130. Similarly, the second stage input gear 144 is connected to and rotates with the high pressure turbine second stage spool 132. The output gear 146 is connected to the high pressure compressor spool 134 via a shaft 148 or similar mechanism and is driven by the first stage input gear 142 via a first bevel gear connection 150 and the second stage input gear 144 via a second bevel gear connection 152. Unlike the first stage input gear 142 and the second stage input gear 144, both of which are configured to rotate about the central longitudinal axis A, the output gear 146, together with the shaft 148 (the combination of which, in various embodiments, is referred to as an output gear assembly), is configured to revolve about the central longitudinal axis A in response to being driven by the first stage input gear 142 and the second stage input gear 144. Further, because the output gear 146 is coupled to the high pressure compressor spool 134 via the shaft 148, the rotational speed of the high pressure compressor spool 134 about the central longitudinal axis A will be the same as the speed at which the output gear 146 revolves about the central longitudinal axis A. In addition, as illustrated, the differential system 140 includes a first differential subassembly $141_1$ that comprises the various gears just described. In various embodiments, however, the differential system 140 may comprise any number of differential subassemblies, including, for example, a second differential subassembly $141_2$, with each of the various differential subassemblies being generally spaced about the central longitudinal axis A.

Still referring to FIGS. 1A and 1B, various operational aspects are described. Assume, for example, the high pressure turbine first stage spool 130, together with the first stage input gear 142, rotate at a first stage spool rotational speed of $N_{HPT1}$, and the high pressure turbine second stage spool 132, together with the second stage input gear 144, rotate at a second stage spool rotational speed of $N_{HPT2}$. With such assumptions, the high pressure compressor spool 134 will rotate at a high pressure compressor spool rotational speed of $N_{HPC}$ (or a compressor spool rotational speed), which may be expressed by the relation $N_{HPC}=(N_{HPT1}\ N_{HPT2})/2$. Thus, where the high pressure turbine first stage spool 130 and the high pressure turbine second stage spool 132 are configured to corotate (i.e., rotate in the same direction about the central longitudinal axis A), the high pressure compressor spool rotational speed, $N_{HPC}$, is simply the arithmetic mean of the two input rotational speeds. Or, in other words, the differential system 140, as described above, operates as a summer device that is configured to split the input rotational speeds of the high pressure turbine first stage spool 130 and the high pressure turbine second stage spool 132. Such configuration enables the first stage 124 of the high pressure turbine 120, the second stage 126 of the high pressure turbine 120 and the high pressure compressor 116 to rotate at different speeds, such that, for example, $N_{HPT1}>N_{HPC}>N_{HPT2}$. Advantageously, the configuration enables the high pressure compressor 116 to rotate at a speed having a value greater than that which might otherwise be limited by maximum allowable stress limits within the blades of the second stage 126 of the high pressure turbine 120 (e.g., maximum centrifugal stress states or $AN^2$ limits). Further, the configuration enables the first stage 124 of the high pressure turbine 120 to rotate at a speed having a value greater than both those of the high pressure compressor 116 and the second stage 126 of the high pressure turbine 120, enabling the first stage 124 to operate at a higher efficiency than that which might otherwise be limited by efficiency or stress considerations of the aforementioned rotating components. Also, in various embodiments, the fan 114 will rotate at a speed equal to that of the low pressure turbine 122 via the low speed spool 128.

Consistent with the foregoing description, in various embodiments, the first motor-generator 160 and the second motor-generator 162 may be employed to adjust—e.g., to increase or decrease—one or both of $N_{HPC}$ and $N_{HPT2}$, respectively, by operating one or both of the respective motor-generators in either a motor-mode or a generator-mode. For example, during transient operation of the gas turbine engine 100—e.g., during a takeoff or an acceleration in flight—increasing the speed of one or both of $N_{HPC}$ and $N_{HPT2}$ may result in increased power or efficiency of the engine without approaching or reaching the applicable maximum centrifugal stress states or $AN^2$ limits of the turbine blades, for example, in the second stage 126 of the high pressure turbine 120. On the other hand, during steady state operation—e.g., during cruise at altitude—adjusting the speed of one or both of $N_{HPC}$ and $N_{HPT2}$ may result in increased efficiency of the engine and the ability to generate power for storage in the storage device.

Figure 2B:
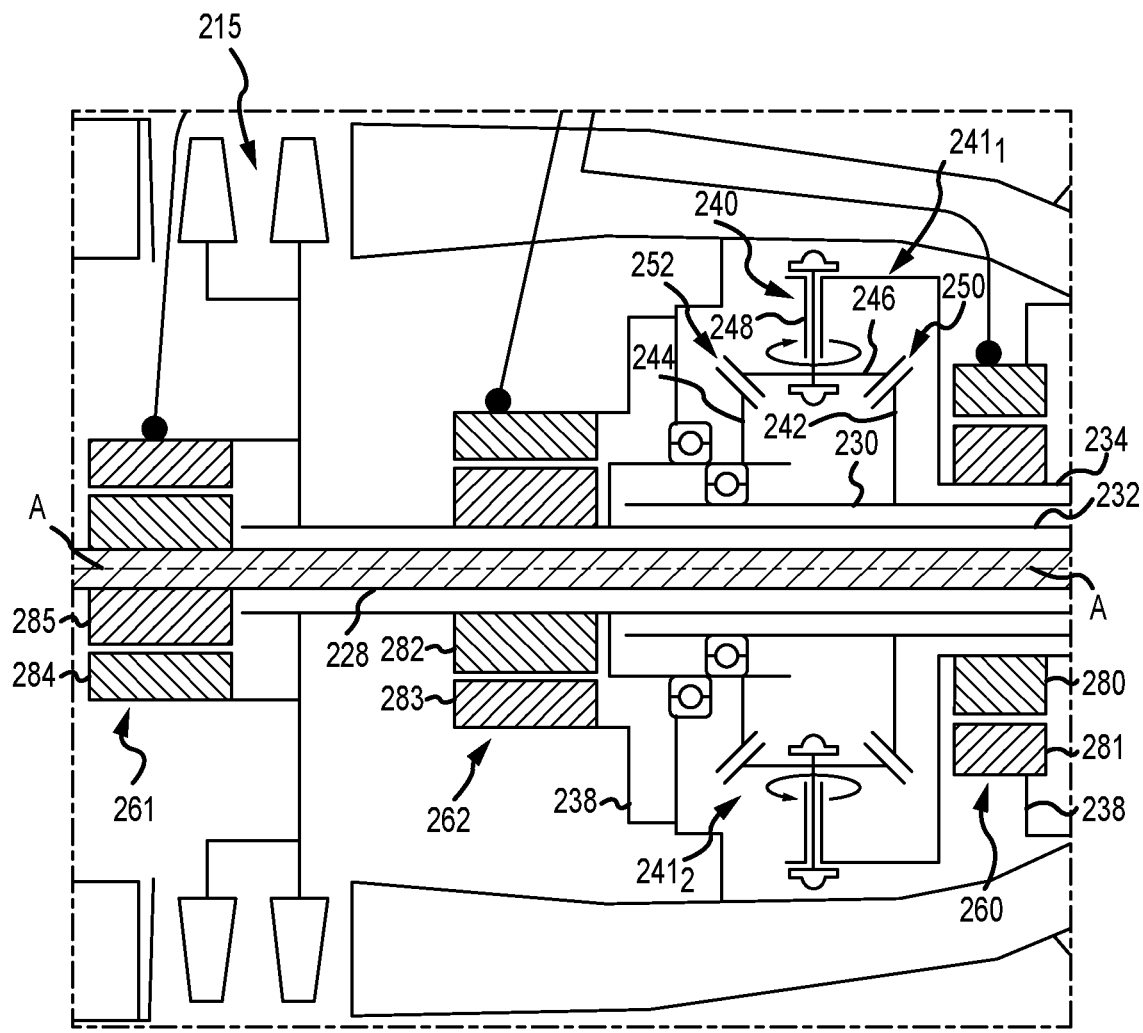
FIG. 2B is a schematic view of a differential system for a gas turbine engine, in accordance with various embodiment.

Referring now to FIGS. 2A and 2B, a gas turbine engine 200 is illustrated, in accordance with various embodiments. As illustrated, the gas turbine engine 200 shares certain of the structural characteristics of the gas turbine engine 100 described above with reference to FIGS. 1A and 1B, a principal exception being the addition of a low pressure compressor 215 to the gas turbine engine 200. Similar to the description above, the gas turbine engine 200 is a four-spool turbofan engine that generally incorporates a fan section 202, a compressor section 204, a combustor section 206 and a turbine section 208. The fan section 202 drives air along a bypass flow path B in a bypass duct defined by a radially inner surface of a nacelle 210 and a radially outer surface of a core engine case 212, while the compressor section 204 drives air along a core flow path C for compression and communication into the combustor section 206 and then expansion through the turbine section 208. The core flow path C is generally ducted through a core duct, which may be defined by the compressor, combustor and turbine sections, radially inward of the core engine case 212. The core duct may also be defined, in part, by a forward strut 211, an intermediate strut 213 and an exit strut 217, each of which may also function as a vane or duct and be formed as part of or connected to a fixed structure for various of the rotating components of the gas turbine engine 200.

More specifically, the fan section 202 includes a fan 214, the compressor section 204 includes the low pressure compressor 215, a high pressure compressor 216, the combustor section 206 includes a combustor 218 and the turbine section 208 includes a high pressure turbine 220 and a low pressure turbine 222. Further, the high pressure turbine 220 includes a first stage 224 and a second stage 226 disposed downstream of the first stage 224. In general, air in the core flow path C is compressed, first by the low pressure compressor 215 and then by the high pressure compressor 216, mixed and burned with fuel in the combustor 218, and then expanded over the high pressure turbine 220 and then the low pressure turbine 222, with the high pressure turbine 220 and the low pressure turbine 222 being configured, as described below, to drive the low pressure compressor 215, the high pressure compressor 216 and the fan 214.

Still referring to FIGS. 2A and 2B, in various embodiments, the gas turbine engine 200 includes a low speed spool 228, a high pressure turbine first stage spool 230, a high pressure turbine second stage spool 232 and a high pressure compressor spool 234. Each of the spools is generally situated within a bearing assembly 236, components of which are housed within or connected to an engine static structure 238, and configured to rotate coaxially with respect to a central longitudinal axis A. The low speed spool 228 is configured to connect the fan 214 to the low pressure turbine 222. While the low speed spool 228 is illustrated as directly connecting the fan 214 and the low pressure turbine 222, it will be appreciated that various intervening drive systems, such as, for example, a fan drive gear system may be incorporated into the gas turbine engine 200 such that the fan 214 rotates at a lower speed than does the low speed spool 228. The high pressure turbine first stage spool 230 and the high pressure turbine second stage spool 232 are configured to drive the high pressure compressor 216, which is mounted on the high pressure compressor spool 234, via a differential system 240. The high pressure turbine second stage spool 232 is also configured to rotate the low pressure compressor 215.

In addition, the gas turbine engine 200 includes an augmentation system which, in various embodiments, may include one or more motor-generators configured to input power to or extract power from various of the spools within the gas turbine engine 200. For example, in various embodiments, a first motor-generator 260 is connected to the high pressure compressor spool 234, a second motor-generator 262 is connected to the high pressure turbine second stage spool 232 and a third motor-generator 261 is connected to the low speed spool 228 and to the high pressure turbine second stage spool 232. In various embodiments, the first motor-generator 260 may comprise an armature 280 that is connected to the high pressure compressor spool 234 and a stator 281 that is connected to the engine static structure 238. Similarly, in various embodiments, the second motor-generator 262 may comprise an armature 282 that is connected to the high pressure turbine second stage spool 232 and a stator 283 that is connected to the engine static structure 238. Also, in various embodiments, the third motor-generator 261 may comprise an armature 284 that is connected to the high pressure turbine second stage spool 232 and a stator 285 that is connected to the low speed spool 228, enabling both the armature 284 and the stator 285 to rotate, but at different speeds such that a motor-like or generator-like operation may be affected between the high pressure turbine second stage spool 232 and the low speed spool 228. The first motor-generator 260 is connected to and controlled by a first controller 264, the second motor-generator 262 is connected to and controlled by a second controller 266 and the third motor-generator 261 is connected to and controlled by a third controller 265. In various embodiments, the first controller 264, the second controller 266 and the third controller 265 are further controlled by a full authority digital electric controller or FADEC 268. While the first controller 264, the second controller 266, the third controller 265 and the FADEC 268 are illustrated as individual components, the disclosure contemplates control of the first motor-generator 260, the second motor-generator 262 and the third motor-generator 261 being accomplished by a controller 270, which may be considered to include combined functionalities of one or more of the first controller 264, the second controller 266, the third controller 265 and the FADEC 268. In various embodiments, an energy storage device 272 is also included within the gas turbine engine 200. The energy storage device 272 may comprise, for example, a battery, a capacitor or any similar rechargeable energy storage component. In various embodiments, the energy storage device 272 may also comprise or be connected to an auxiliary source of power, such as, for example, an auxiliary power unit or APU 274.

In various embodiments, the controller 270 is configured to monitor and control operation of the first motor-generator 260, the second motor-generator 262 and the third motor-generator 261, based on whether one or more of the motor-generators are required to drive the spool to which it is attached, to generate power for storage in the energy storage device 272 or to carry out load-sharing between the various spools and the components attached thereto. For example, in various embodiments, the first motor-generator 260 may be employed to increase (or maintain) the rotational speed of the high pressure compressor spool 234 by providing power to the first motor-generator 260 (i.e., the motor-generator is being used as a motor). In various embodiments, the first motor-generator 260 may also be employed to decrease (or maintain) the rotational speed of the high pressure compressor spool 234 by extracting power from the first motor-generator 260 (i.e., the motor-generator is being used as a generator). Similarly, in various embodiments, the second motor-generator 262 may be employed to increase (or maintain) the rotational speed of the high pressure turbine second stage spool 232 by providing power to the second motor-generator 262 (i.e., the motor-generator is being used as a motor). In various embodiments, the second motor-generator 262 may also be employed to decrease (or maintain) the rotational speed of the high pressure turbine second stage spool 232 by extracting power from the second motor-generator 262 (i.e., the motor-generator is being used as a generator). In addition, in various embodiments, the third motor-generator 261 may be employed to increase (or maintain) the rotational speed of the high pressure turbine second stage spool 232 by providing power to the third motor-generator 261 (i.e., the motor-generator is being used as a motor). In various embodiments, the third motor-generator 261 may also be employed to decrease (or maintain) the rotational speed of the high pressure turbine second stage spool 232 by extracting power from the third motor-generator 261 (i.e., the motor-generator is being used as a generator).

Referring more specifically, to FIG. 2B, the differential system 240 includes a first stage input gear 242, a second stage input gear 244 and an output gear 246, where the first stage input gear 242 and the second stage input gear 244 are sized the same (e.g., the gears share the same number of teeth and the same radius). As illustrated, the first stage input gear 242 is connected to and rotates with the high pressure turbine first stage spool 230. Similarly, the second stage input gear 244 is connected to and rotates with the high pressure turbine second stage spool 232. The output gear 246 is connected to the high pressure compressor spool 234 via a shaft 248 or similar mechanism and is driven by the first stage input gear 242 via a first bevel gear connection 250 and the second stage input gear 244 via a second bevel gear connection 252. Unlike the first stage input gear 242 and the second stage input gear 244, both of which are configured to rotate about the central longitudinal axis A, the output gear 246, together with the shaft 248 (the combination of which, in various embodiments, is referred to as an output gear assembly), is configured to revolve about the central longitudinal axis A in response to being driven by the first stage input gear 242 and the second stage input gear 244. Further, because the output gear 246 is coupled to the high pressure compressor spool 234 via the shaft 248, the rotational speed of the high pressure compressor spool 234 about the central longitudinal axis A will be the same as the speed at which the output gear 246 revolves about the central longitudinal axis A. In addition, as illustrated, the differential system 240 includes a first differential subassembly $241_1$ that comprises the various gears just described. In various embodiments, however, the differential system 240 may comprise any number of differential subassemblies, such as, for example, a second differential subassembly $241_2$, with each of the various differential subassemblies being generally spaced about the central longitudinal axis A.

Still referring to FIGS. 2A and 2B, various operational aspects are described that are similar to the operational aspects described above with reference to FIGS. 1A and 1B. Assume, for example, the high pressure turbine first stage spool 230, together with the first stage input gear 242, rotate at a first stage spool rotational speed of $N_{HPT1}$, and the high pressure turbine second stage spool 232, together with the second stage input gear 244, rotate at a second stage spool rotational speed of $N_{HPT2}$. With such assumptions, the high pressure compressor spool 234 will rotate at a high pressure compressor spool rotational speed of $N_{HPC}$, which may be expressed by the relation $N_{HPC}=(N_{HPT1}+N_{HPT2})/2$. Thus, where the high pressure turbine first stage spool 230 and the high pressure turbine second stage spool 232 are configured to corotate (i.e., rotate in the same direction about the central longitudinal axis A), the high pressure compressor spool rotational speed, $N_{HPC}$, is simply the arithmetic mean of the two input rotational speeds. Or, in other words, the differential system 240, as described above, operates as a summer device that is configured to split the input rotational speeds of the high pressure turbine first stage spool 230 and the high pressure turbine second stage spool 232. Such configuration enables the first stage 224 of the high pressure turbine 220, the second stage 226 of the high pressure turbine 220, the low pressure compressor 215 and the high pressure compressor 216 to rotate at different speeds, such that, for example, $N_{HPT1}>N_{HPC}>N_{HPT2}$. Similar to the discussion above, the configuration enables the high pressure compressor 216 to rotate at a speed greater than that which might otherwise be limited by maximum allowable stress limits within the blades of the second stage 226 of the high pressure turbine 220 (e.g., maximum centrifugal stress states or $AN^2$ limits). Further, the configuration enables the first stage 224 of the high pressure turbine 220 to rotate at a speed greater than both those of the high pressure compressor 216 and the second stage 226 of the high pressure turbine 220, enabling the first stage 224 to operate at a higher efficiency than that which might otherwise be limited by efficiency or stress considerations of the aforementioned rotating components. Also, in various embodiments, the fan 214 will rotate at a speed equal to that of the low pressure turbine 222 via the low speed spool 228, while the low pressure compressor 215 will rotate at a speed equal to $N_{HPT2}$ via the high pressure turbine second stage spool 232.

Consistent with the foregoing description, in various embodiments, the first motor-generator 260, the second motor-generator 262 and the third motor-generator 261 may be employed to adjust—e.g., to increase or decrease—one or both of $N_{HPC}$ and $N_{HPT2}$, respectively, by operating one or more of the respective motor-generators in either a motor-mode or a generator-mode. For example, during transient operation of the gas turbine engine 200—e.g., during a takeoff or an acceleration in flight—increasing the speed of one or both of $N_{HPC}$ and $N_{HPT2}$ may result in increased power or efficiency of the engine without approaching or reaching the applicable maximum centrifugal stress states or $AN^2$ limits of the turbine blades, for example, in the second stage 226 of the high pressure turbine 220. On the other hand, during steady state operation—e.g., during cruise at altitude—adjusting the speed of one or both of $N_{HPC}$ and $N_{HPT2}$ may result in increased efficiency of the engine and the ability to generate power for storage in the storage device. Further, in various embodiments and as illustrated and described herein, where the rotational speed of the low pressure compressor 215, $N_{LPC}$, is less than $N_{HPC}$, and the low pressure compressor 215 is not coupled to the fan 214 (e.g., through a shaft or fan drive gear system connected to the low pressure compressor 215), $N_{LPC}$ becomes independent of the rotational speed of the fan 214, $N_{FAN}$. This facilitates an increase in the pressure ratio across the low pressure compressor 215, leading to an increase in the overall pressure ratio across the compressor section 204, including both the low pressure compressor 215 and the high pressure compressor 216.

Figure 3A:
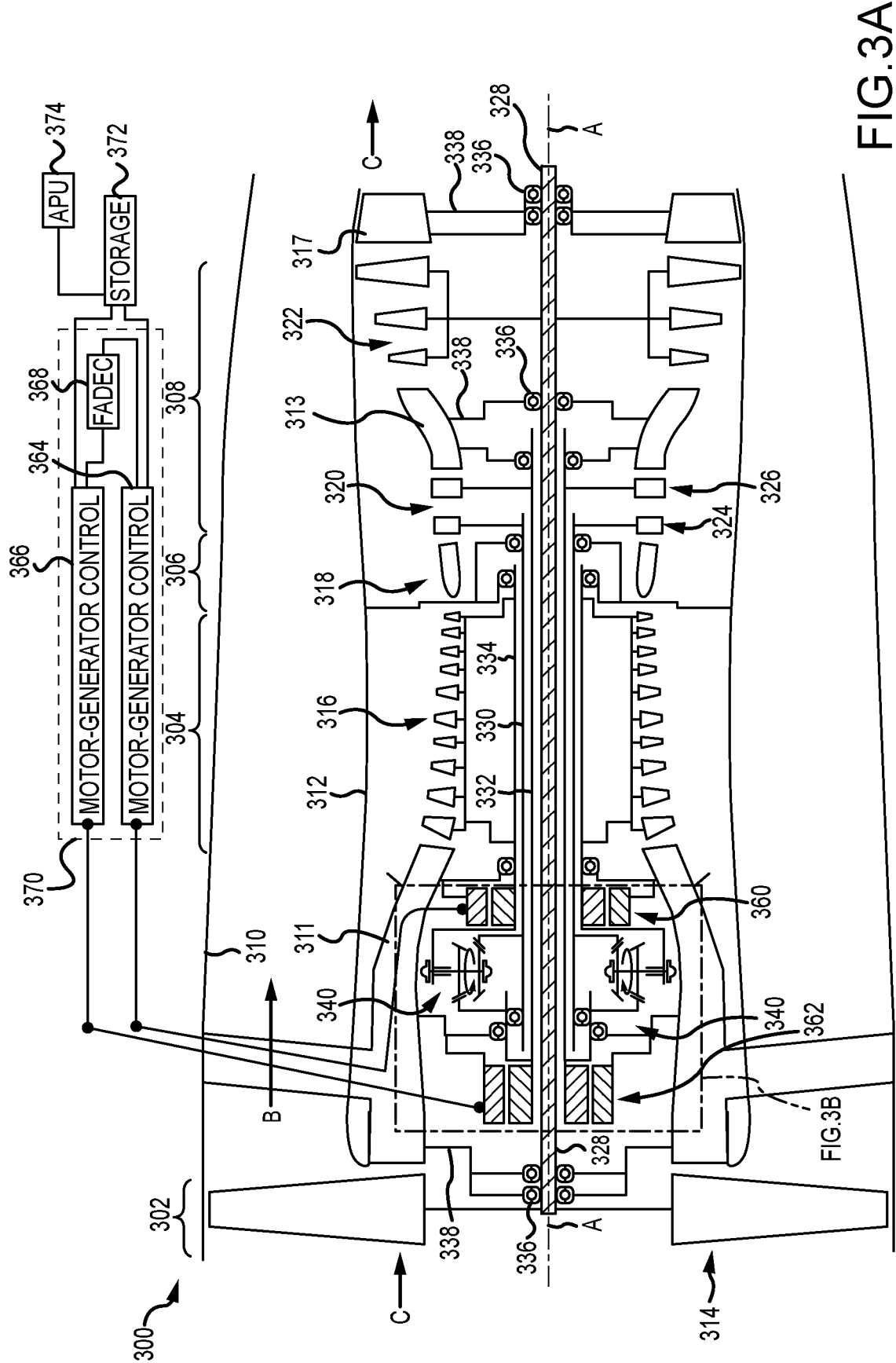
FIG. 3A is a schematic view of a gas turbine engine, in accordance with various embodiments.
Figure 3B:
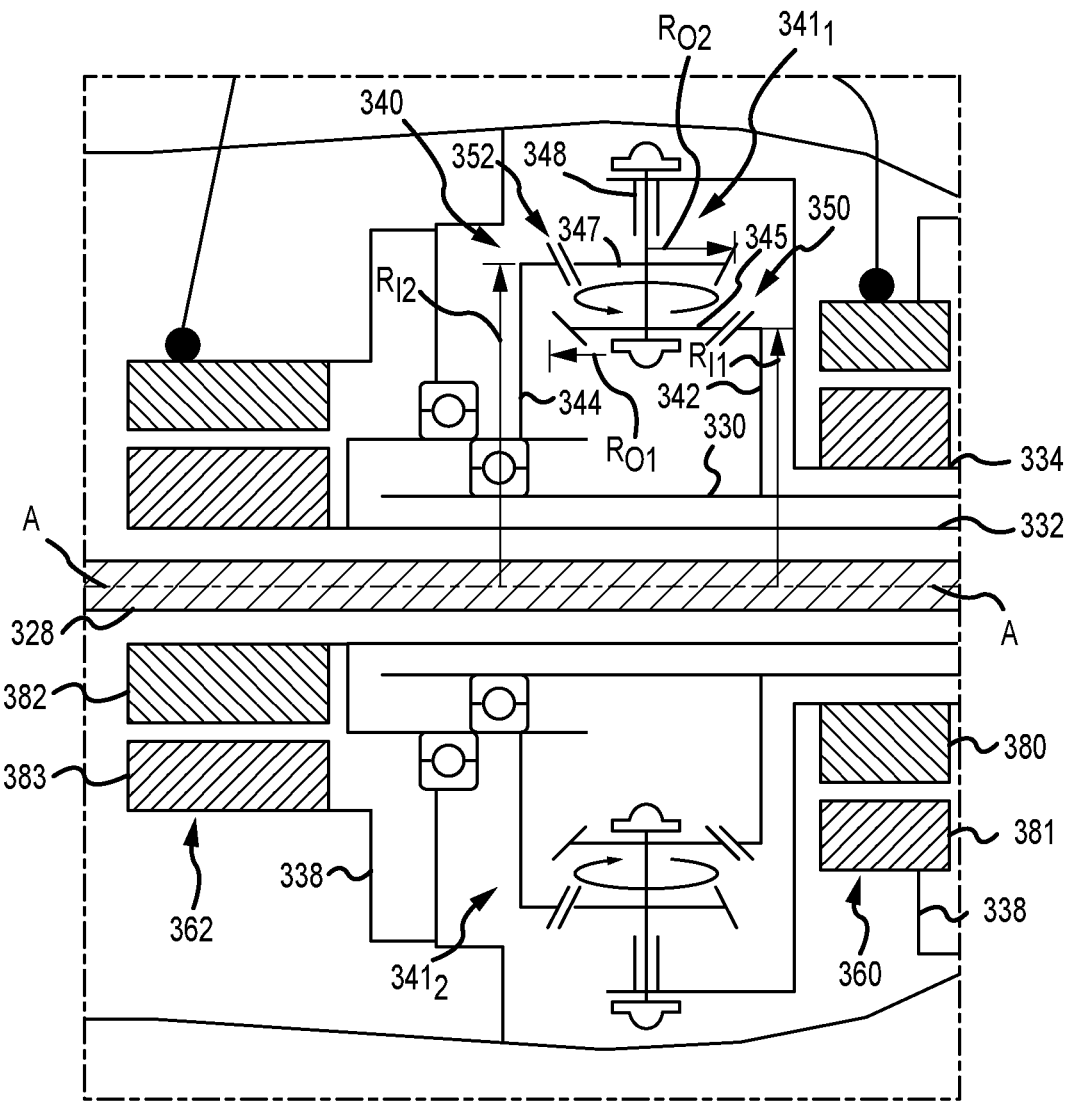
FIG. 3B is a schematic view of a differential system for a gas turbine engine, in accordance with various embodiment.

Referring now to FIGS. 3A and 3B a gas turbine engine 300 is illustrated, in accordance with various embodiments. The gas turbine engine 300 is disclosed herein as a four-spool turbofan engine that generally incorporates a fan section 302, a compressor section 304, a combustor section 306 and a turbine section 308. The fan section 302 drives air along a bypass flow path B in a bypass duct defined by a radially inner surface of a nacelle 310 and a radially outer surface of a core engine case 312, while the compressor section 304 drives air along a core flow path C for compression and communication into the combustor section 306 and then expansion through the turbine section 308. The core flow path C is generally ducted through a core duct, which may be defined by the compressor, combustor and turbine sections, radially inward of the core engine case 312. The core duct may also be defined, in part, by a forward strut 311, an intermediate strut 313 and an exit strut 317, each of which may also function as a vane or duct and be formed as part of or connected to a fixed structure for various of the rotating components of the gas turbine engine 300.

More specifically, the fan section 302 includes a fan 314, the compressor section 304 includes a high pressure compressor 316, the combustor section 306 includes a combustor 318 and the turbine section 308 includes a high pressure turbine 320 and a low pressure turbine 322. Further, the high pressure turbine 320 includes a first stage 324 and a second stage 326 disposed downstream of the first stage 324. In general, air in the core flow path C is compressed by the high pressure compressor 316, mixed and burned with fuel in the combustor 318, and then expanded over the high pressure turbine 320 and the low pressure turbine 322, with the high pressure turbine 320 and the low pressure turbine 322 being configured, as described below, to drive the high pressure compressor 316 and the fan 314.

Still referring to FIGS. 3A and 3B, in various embodiments, the gas turbine engine 300 includes a low speed spool 328, a high pressure turbine first stage spool 330 (or a first stage spool), a high pressure turbine second stage spool 332 (or a second stage spool) and a high pressure compressor spool 334 (or a compressor spool). Each of the spools is generally situated within a bearing assembly 336, components of which are housed within or connected to an engine static structure 338, and configured to rotate coaxially with respect to a central longitudinal axis A. The low speed spool 328 is configured to connect the fan 314 to the low pressure turbine 322. While the low speed spool 328 is illustrated as directly connecting the fan 314 and the low pressure turbine 322, it will be appreciated that various intervening drive systems, such as, for example, a fan drive gear system may be incorporated into the gas turbine engine 300 such that the fan 314 rotates at a lower speed than does the low speed spool 328. The high pressure turbine first stage spool 330 and the high pressure turbine second stage spool 332 are configured to drive the high pressure compressor 316, which is mounted on the high pressure compressor spool 334, via a differential system 340.

In addition, the gas turbine engine 300 includes an augmentation system which, in various embodiments, may include one or more motor-generators configured to input power to or extract power from various of the spools within the gas turbine engine 300. For example, in various embodiments, a first motor-generator 360 is connected to the high pressure compressor spool 334 and a second motor-generator 362 is connected to the high pressure turbine second stage spool 332. In various embodiments, the first motor-generator 360 may comprise an armature 380 that is connected to the high pressure compressor spool 334 and a stator 381 that is connected to the engine static structure 338. Similarly, in various embodiments, the second motor-generator 362 may comprise an armature 382 that is connected to the high pressure turbine second stage spool 332 and a stator 383 that is connected to the engine static structure 338. The first motor-generator 360 is connected to and controlled by a first controller 364 and the second motor-generator 362 is connected to and controlled by a second controller 366. In various embodiments, the first controller 364 and the second controller 366 are further controlled by a full authority digital electric controller or FADEC 368. While the first controller 364, the second controller 366 and the FADEC 368 are illustrated as individual components, the disclosure contemplates control of the first motor-generator 360 and the second motor-generator 362 being accomplished by a controller 370, which may be considered to include combined functionalities of one or more of the first controller 364, the second controller 366 and the FADEC 368. In various embodiments, an energy storage device 372 is also included within the gas turbine engine 300. The energy storage device 372 may comprise, for example, a battery, a capacitor or any similar rechargeable energy storage component. In various embodiments, the energy storage device 372 may also comprise or be connected to an auxiliary source of power, such as, for example, an auxiliary power unit or APU 374.

In various embodiments, the controller 370 is configured to monitor and control operation of the first motor-generator 360 and the second motor-generator 362, based on whether one or both of the motor-generators are required to drive the spool to which it is attached, to generate power for storage in the energy storage device 372 or to carry out load-sharing between the various spools and the components attached thereto. For example, in various embodiments, the first motor-generator 360 may be employed to increase (or maintain) the rotational speed of the high pressure compressor spool 334 by providing power to the first motor-generator 360 (i.e., the motor-generator is being used as a motor). In various embodiments, the first motor-generator 360 may also be employed to decrease (or maintain) the rotational speed of the high pressure compressor spool 334 by extracting power from the first motor-generator 360 (i.e., the motor-generator is being used as a generator). Similarly, in various embodiments, the second motor-generator 362 may be employed to increase (or maintain) the rotational speed of the high pressure turbine second stage spool 332 by providing power to the second motor-generator 362 (i.e., the motor-generator is being used as a motor). In various embodiments, the second motor-generator 362 may also be employed to decrease (or maintain) the rotational speed of the high pressure turbine second stage spool 332 by extracting power from the second motor-generator 362 (i.e., the motor-generator is being used as a generator).

Referring more specifically, to FIG. 3B, the differential system 340 includes a first stage input gear 342, a second stage input gear 344, a first stage output gear 345 and a second stage output gear 347. As illustrated, the first stage input gear 342 is connected to and rotates with the high pressure turbine first stage spool 330. Similarly, the second stage input gear 344 is connected to and rotates with the high pressure turbine second stage spool 332. The first stage output gear 345 and the second stage output gear 347 are connected to the high pressure compressor spool 334 via a shaft 348 or similar mechanism and are driven, respectively, by the first stage input gear 342 via a first bevel gear connection 350 and the second stage input gear 344 via a second bevel gear connection 352. Unlike the first stage input gear 342 and the second stage input gear 344, both of which are configured to rotate about the central longitudinal axis A, the first stage output gear 345 and the second stage output gear 347, together with the shaft 348 (the combination of which, in various embodiments, is referred to as an output gear assembly), are configured to revolve about the central longitudinal axis A in response to being driven by the first stage input gear 342 and the second stage input gear 344. In addition, as illustrated, the differential system 340 includes a first differential subassembly $341_1$ that comprises the various gears just described. In various embodiments, however, the differential system 340 may comprise any number of differential subassemblies, including, for example, a second differential subassembly $341_2$, with each of the various differential subassemblies being generally spaced about the central longitudinal axis A.

Still referring to FIGS. 3A and 3B, various operational aspects are described. Assume, for example, the first stage input gear 342 has a first number of input gear teeth, $N_{I1}$, that is proportional to a first radius, $R_{I1}$, of the first stage input gear 342, while the second stage input gear 344 has a second number of input gear teeth, $N_{I2}$, that is proportional to a second radius, $R_{I2}$, of the second stage input gear 344. Similarly, assume the first stage output gear 345 has a first number of output gear teeth, $N_{O1}$, that is proportional to a first radius, $R_{O1}$, of the first stage output gear 345, while the second stage output gear 347 has a second number of output gear teeth, $N_{O2}$, that is proportional to a second radius, $R_{O2}$, of the second stage output gear 347. Assume as well the high pressure turbine first stage spool 330, together with the first stage input gear 342, rotate at a first stage spool rotational speed of $N_{HPT1}$, and the high pressure turbine second stage spool 332, together with the second stage input gear 344, rotate at a second stage spool rotational speed of $N_{HPT2}$. With such assumptions, the high pressure compressor spool 334 will rotate at a high pressure compressor spool rotational speed of $N_{HPC}$ (or a compressor spool rotational speed), which may be expressed by the relation $N_{HPC} = (N_{HPT1} \, K*N_{HPT2})/(K+1)$, where $K=(R_{I2}*R_{O1})/(R_{I1}*R_{O2})=(N_{I2}*N_{O1})/(N_{I1}*N_{O2})$. Thus, where the high pressure turbine first stage spool 330 and the high pressure turbine second stage spool 332 are configured to corotate (i.e., rotate in the same direction about the central longitudinal axis A), the high pressure compressor spool rotational speed, $N_{HPC}$, is a function of the spool speeds $N_{HPT1}$ and $N_{HPT2}$ as well as the gear ratios of the differential system 340. Note that where R I1=$R_{I2}$ and $R_{O1}$=$R_{O2}$, then K=1 and the high pressure compressor spool rotational speed, $N_{HPC}$, is simply the arithmetic mean of the two input spool speeds; or, in other words, where K=1, the differential system 340, as described above, operates as a summer device that is configured to split the input rotational speeds of the high pressure turbine first stage spool 330 and the high pressure turbine second stage spool 332.

The general configuration above described enables the first stage 324 of the high pressure turbine 320, the second stage 326 of the high pressure turbine 320 and the high pressure compressor 316 to rotate at different speeds, such that, for example, $N_{HPT1} > N_{HPC} > N_{HPT2}$. For example, if one assumes $N_{I2}$=48, $N_{I1}$=24, $N_{O1}$=36 and $N_{O2}$=18, then K=4. Thus, for $N_{HPT1}$=12,000 rpm (≈1,256 rad/sec) and $N_{HPT2}$=9, 500 rpm (≈995 rad/sec), $N_{HPC}$=10,000 rpm (≈1,047 rad/sec). Advantageously, then, the configuration enables the high pressure compressor 316 to rotate at a speed having a value greater than that which might otherwise be limited by maximum allowable stress limits within the blades of the second stage 326 of the high pressure turbine 320 (e.g., maximum centrifugal stress states or $AN^2$ limits). Further, the configuration enables the first stage 324 of the high pressure turbine 320 to rotate at a speed having a value greater than both those of the high pressure compressor 316 and the second stage 326 of the high pressure turbine 320, enabling the first stage 324 to operate at a higher efficiency than that which might otherwise be limited by efficiency or stress considerations of the aforementioned rotating components. Also, in various embodiments, the fan 314 will rotate at a speed equal to that of the low pressure turbine 322 via the low speed spool 328.

Consistent with the foregoing description, in various embodiments, the first motor-generator 360 and the second motor-generator 362 may be employed to adjust—e.g., to increase or decrease—one or both of $N_{HPC}$ and $N_{HPT2}$, respectively, by operating one or both of the respective motor-generators in either a motor-mode or a generator-mode. For example, during transient operation of the gas turbine engine 300—e.g., during a takeoff or an acceleration in flight—increasing the speed of one or both of $N_{HPC}$ and $N_{HPT2}$ may result in increased power or efficiency of the engine without approaching or reaching the applicable maximum centrifugal stress states or $AN^2$ limits of the turbine blades, for example, in the second stage 326 of the high pressure turbine 320. On the other hand, during steady state operation—e.g., during cruise at altitude—adjusting the speed of one or both of $N_{HPC}$ and $N_{HPT2}$ may result in increased efficiency of the engine and the ability to generate power for storage in the storage device.

Figure 4B:
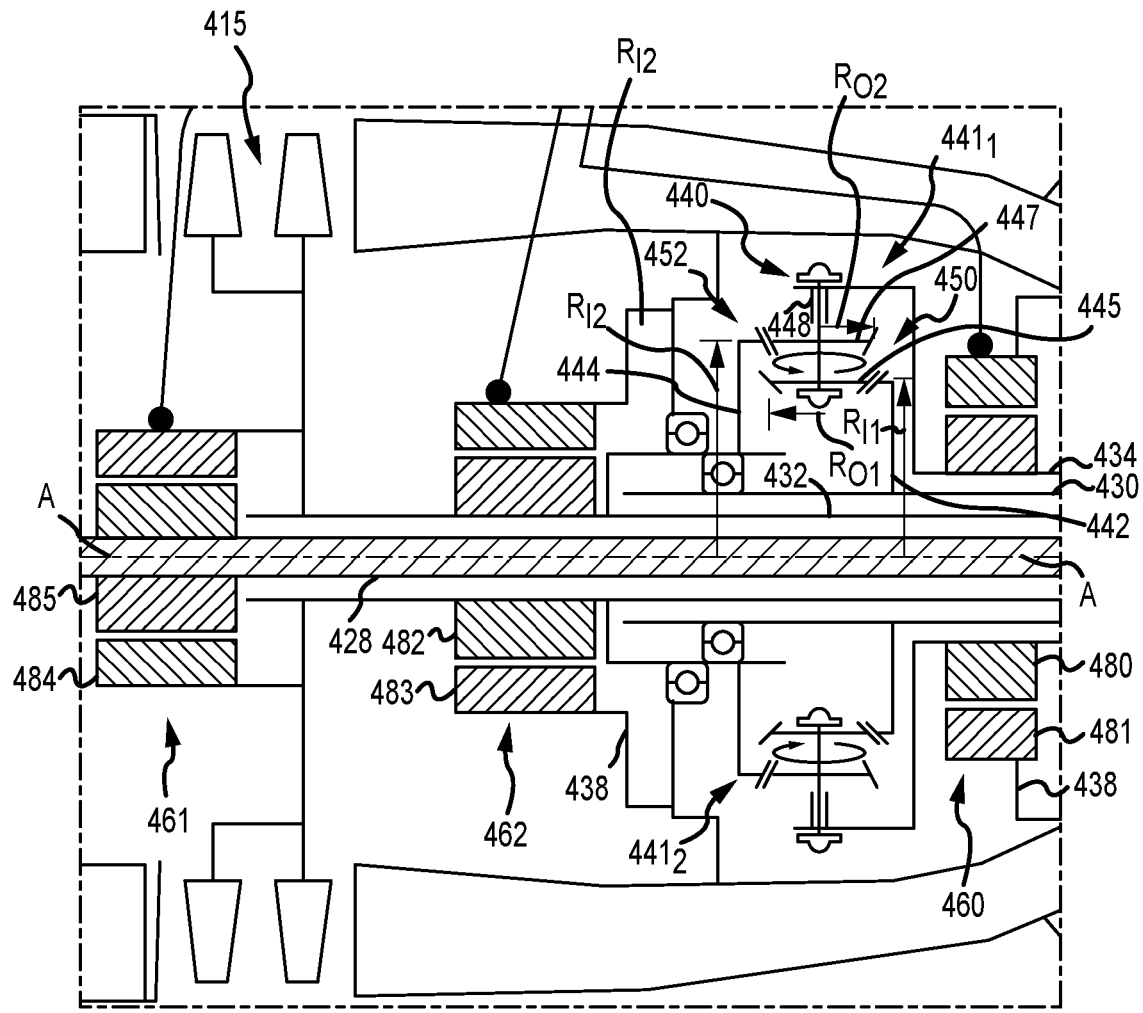
FIG. 4B is a schematic view of a differential system for a gas turbine engine, in accordance with various embodiment.

Referring now to FIGS. 4A and 4B, a gas turbine engine 400 is illustrated, in accordance with various embodiments. As illustrated, the gas turbine engine 400 shares certain of the structural characteristics of the gas turbine engine 300 described above with reference to FIGS. 3A and 3B, a principal exception being the addition of a low pressure compressor 415 to the gas turbine engine 400. Similar to the description above, the gas turbine engine 400 is a four-spool turbofan engine that generally incorporates a fan section 402, a compressor section 404, a combustor section 406 and a turbine section 408. The fan section 402 drives air along a bypass flow path B in a bypass duct defined by a radially inner surface of a nacelle 410 and a radially outer surface of a core engine case 412, while the compressor section 404 drives air along a core flow path C for compression and communication into the combustor section 406 and then expansion through the turbine section 408. The core flow path C is generally ducted through a core duct, which may be defined by the compressor, combustor and turbine sections, radially inward of the core engine case 412. The core duct may also be defined, in part, by a forward strut 411, an intermediate strut 413 and an exit strut 417, each of which may also function as a vane or duct and be formed as part of or connected to a fixed structure for various of the rotating components of the gas turbine engine 400.

More specifically, the fan section 402 includes a fan 414, the compressor section 404 includes the low pressure compressor 415, a high pressure compressor 416, the combustor section 406 includes a combustor 418 and the turbine section 408 includes a high pressure turbine 420 and a low pressure turbine 422. Further, the high pressure turbine 420 includes a first stage 424 and a second stage 426 disposed downstream of the first stage 424. In general, air in the core flow path C is compressed, first by the low pressure compressor 415 and then by the high pressure compressor 416, mixed and burned with fuel in the combustor 418, and then expanded over the high pressure turbine 420 and then the low pressure turbine 422, with the high pressure turbine 420 and the low pressure turbine 422 being configured, as described below, to drive the low pressure compressor 415, the high pressure compressor 416 and the fan 414.

Still referring to FIGS. 4A and 4B, in various embodiments, the gas turbine engine 400 includes a low speed spool 428, a high pressure turbine first stage spool 430, a high pressure turbine second stage spool 432 and a high pressure compressor spool 434. Each of the spools is generally situated within a bearing assembly 436, components of which are housed within or connected to an engine static structure 438, and configured to rotate coaxially with respect to a central longitudinal axis A. The low speed spool 428 is configured to connect the fan 414 to the low pressure turbine 422. While the low speed spool 428 is illustrated as directly connecting the fan 414 and the low pressure turbine 422, it will be appreciated that various intervening drive systems, such as, for example, a fan drive gear system may be incorporated into the gas turbine engine 400 such that the fan 414 rotates at a lower speed than does the low speed spool 428. The high pressure turbine first stage spool 430 and the high pressure turbine second stage spool 432 are configured to drive the high pressure compressor 416, which is mounted on the high pressure compressor spool 434, via a differential system 440. The high pressure turbine second stage spool 432 is also configured to rotate the low pressure compressor 415.

Referring more specifically, to FIG. 4B, the differential system 440 includes a first stage input gear 442, a second stage input gear 444, a first stage output gear 445 and a second stage output gear 447. As illustrated, the first stage input gear 442 is connected to and rotates with the high pressure turbine first stage spool 430. Similarly, the second stage input gear 444 is connected to and rotates with the high pressure turbine second stage spool 432. The first stage output gear 445 and the second stage output gear 447 are connected to the high pressure compressor spool 434 via a shaft 448 or similar mechanism and are driven, respectively, by the first stage input gear 442 via a first bevel gear connection 450 and the second stage input gear 444 via a second bevel gear connection 452. Unlike the first stage input gear 442 and the second stage input gear 444, both of which are configured to rotate about the central longitudinal axis A, the first stage output gear 445 and the second stage output gear 447, together with the shaft 448 (the combination of which, in various embodiments, is referred to as an output gear assembly), are configured to revolve about the central longitudinal axis A in response to being driven by the first stage input gear 442 and the second stage input gear 444. In addition, as illustrated, the differential system 440 includes a first differential subassembly 441₁ that comprises the various gears just described. In various embodiments, however, the differential system 440 may comprise any number of differential subassemblies, including, for example, a second differential subassembly 441₂, with each of the various differential subassemblies being generally spaced about the central longitudinal axis A.

In addition, the gas turbine engine 400 includes an augmentation system which, in various embodiments, may include one or more motor-generators configured to input power to or extract power from various of the spools within the gas turbine engine 400. For example, in various embodiments, a first motor-generator 460 is connected to the high pressure compressor spool 434, a second motor-generator 462 is connected to the high pressure turbine second stage spool 432 and a third motor-generator 461 is connected to the low speed spool 428 and to the high pressure turbine second stage spool 432. In various embodiments, the first motor-generator 460 may comprise an armature 480 that is connected to the high pressure compressor spool 434 and a stator 481 that is connected to the engine static structure 438. Similarly, in various embodiments, the second motor-generator 462 may comprise an armature 482 that is connected to the high pressure turbine second stage spool 432 and a stator 483 that is connected to the engine static structure 438. Also, in various embodiments, the third motor-generator 461 may comprise an armature 484 that is connected to the high pressure turbine second stage spool 432 and a stator 485 that is connected to the low speed spool 428, enabling both the armature 484 and the stator 485 to rotate, but at different speeds such that a motor-like or generator-like operation may be affected between the high pressure turbine second stage spool 432 and the low speed spool 428. The first motor-generator 460 is connected to and controlled by a first controller 464, the second motor-generator 462 is connected to and controlled by a second controller 466 and the third motor-generator 461 is connected to and controlled by a third controller 465. In various embodiments, the first controller 464, the second controller 466 and the third controller 465 are further controlled by a full authority digital electric controller or FADEC 468. While the first controller 464, the second controller 466, the third controller 465 and the FADEC 468 are illustrated as individual components, the disclosure contemplates control of the first motor-generator 460, the second motor-generator 462 and the third motor-generator 461 being accomplished by a controller 470, which may be considered to include combined functionalities of one or more of the first controller 464, the second controller 466, the third controller 465 and the FADEC 468. In various embodiments, an energy storage device 472 is also included within the gas turbine engine 400. The energy storage device 472 may comprise, for example, a battery, a capacitor or any similar rechargeable energy storage component. In various embodiments, the energy storage device 472 may also comprise or be connected to an auxiliary source of power, such as, for example, an auxiliary power unit or APU 474.

In various embodiments, the controller 470 is configured to monitor and control operation of the first motor-generator 460, the second motor-generator 462 and the third motor-generator 461, based on whether one or more of the motor-generators are required to drive the spool to which it is attached, to generate power for storage in the energy storage device 472 or to carry out load-sharing between the various spools and the components attached thereto. For example, in various embodiments, the first motor-generator 460 may be employed to increase (or maintain) the rotational speed of the high pressure compressor spool 434 by providing power to the first motor-generator 460 (i.e., the motor-generator is being used as a motor). In various embodiments, the first motor-generator 460 may also be employed to decrease (or maintain) the rotational speed of the high pressure compressor spool 434 by extracting power from the first motor-generator 460 (i.e., the motor-generator is being used as a generator). Similarly, in various embodiments, the second motor-generator 462 may be employed to increase (or maintain) the rotational speed of the high pressure turbine second stage spool 432 by providing power to the second motor-generator 462 (i.e., the motor-generator is being used as a motor). In various embodiments, the second motor-generator 462 may also be employed to decrease (or maintain) the rotational speed of the high pressure turbine second stage spool 432 by extracting power from the second motor-generator 462 (i.e., the motor-generator is being used as a generator). In addition, in various embodiments, the third motor-generator 461 may be employed to increase (or maintain) the rotational speed of the high pressure turbine second stage spool 432 by providing power to the third motor-generator 461 (i.e., the motor-generator is being used as a motor). In various embodiments, the third motor-generator 461 may also be employed to decrease (or maintain) the rotational speed of the high pressure turbine second stage spool 432 by extracting power from the third motor-generator 461 (i.e., the motor-generator is being used as a generator).

Still referring to FIGS. 4A and 4B, various operational aspects are described. Assume, for example, the first stage input gear 442 has a first number of input gear teeth, $N_{I1}$, that is proportional to a first radius, $R_{I1}$, of the first stage input gear 442, while the second stage input gear 444 has a second number of input gear teeth, $N_{I2}$, that is proportional to a second radius, $R_{I2}$, of the second stage input gear 444. Similarly, assume the first stage output gear 445 has a first number of output gear teeth, $N_{O1}$, that is proportional to a first radius, $R_{O1}$, of the first stage output gear 445, while the second stage output gear 447 has a second number of output gear teeth, $N_{O2}$, that is proportional to a second radius, $R_{O2}$, of the second stage output gear 447. Assume as well the high pressure turbine first stage spool 430, together with the first stage input gear 442, rotate at a first stage spool rotational speed of $N_{HPT1}$, and the high pressure turbine second stage spool 432, together with the second stage input gear 444, rotate at a second stage spool rotational speed of $N_{HPT2}$. With such assumptions, the high pressure compressor spool 434 will rotate at a high pressure compressor spool rotational speed of $N_{HPC}$ (or a compressor spool rotational speed), which may be expressed by the relation $N_{HPC} = (N_{HPT1} K^* N_{HPT2})/(K+1)$, where $K=(R_{I2}^* R_{O1})/(R_{I1}^* R_{O2})=(N_{I2}^* N_{O1})/(N_{I1}^* N_{O2})$. Thus, where the high pressure turbine first stage spool 430 and the high pressure turbine second stage spool 432 are configured to corotate (i.e., rotate in the same direction about the central longitudinal axis A), the high pressure compressor spool rotational speed, $N_{HPC}$, is a function of the spool speeds $N_{HPT1}$ and $N_{HPT2}$ as well as the gear ratios of the differential system 440. Note that where $R_{I1}=R_{I2}$ and $R_{O1}=R_{O2}$, then K=1 and the high pressure compressor spool rotational speed, $N_{HPC}$, is simply the arithmetic mean of the two input spool speeds; or, in other words, where K=1, the differential system 440, as described above, operates as a summer device that is configured to split the input rotational speeds of the high pressure turbine first stage spool 430 and the high pressure turbine second stage spool 432.

The general configuration above described enables the first stage 424 of the high pressure turbine 420, the second stage 426 of the high pressure turbine 420 and the high pressure compressor 416 to rotate at different speeds, such that, for example, $N_{HPT1} > N_{HPC} > N_{HPT2}$. For example, if one assumes $N_{I2}=48$, $N_{I1}=24$, $N_{O1}=36$ and $N_{O2}=18$, then K=4. Thus, for $N_{HPT1}=12,000$ rpm ($\approx 1,256$ rad/sec) and $N_{HPT2}=9,500$ rpm ($\approx 995$ rad/sec), $N_{HPC}=10,000$ rpm ($\approx 1,047$ rad/sec). Advantageously, then, the configuration enables the high pressure compressor 416 to rotate at a speed having a value greater than that which might otherwise be limited by maximum allowable stress limits within the blades of the second stage 426 of the high pressure turbine 420 (e.g., maximum centrifugal stress states or $AN^2$ limits). Further, the configuration enables the first stage 424 of the high pressure turbine 420 to rotate at a speed having a value greater than both those of the high pressure compressor 416 and the second stage 426 of the high pressure turbine 420, enabling the first stage 424 to operate at a higher efficiency than that which might otherwise be limited by efficiency or stress considerations of the aforementioned rotating components. Also, in various embodiments, the fan 414 will rotate at a speed equal to that of the low pressure turbine 422 via the low speed spool 428, while the low pressure compressor 415 will rotate at a speed equal to $N_{HPT2}$ via the high pressure turbine second stage spool 432.

Consistent with the foregoing description, in various embodiments, the first motor-generator 460, the second motor-generator 462 and the third motor-generator 461 may be employed to adjust—e.g., to increase or decrease—one or both of $N_{HPC}$ and $N_{HPT2}$, respectively, by operating one or more of the respective motor-generators in either a motor-mode or a generator-mode. For example, during transient operation of the gas turbine engine 400—e.g., during a takeoff or an acceleration in flight—increasing the speed of one or both of $N_{HPC}$ and $N_{HPT2}$ may result in increased power or efficiency of the engine without approaching or reaching the applicable maximum centrifugal stress states or $AN^2$ limits of the turbine blades, for example, in the second stage 426 of the high pressure turbine 420. On the other hand, during steady state operation—e.g., during cruise at altitude—adjusting the speed of one or both of $N_{HPC}$ and $N_{HPT2}$ may result in increased efficiency of the engine and the ability to generate power for storage in the storage device. Further, in various embodiments and as illustrated and described herein, the torque split differential, where K>1, enables customization of splitting the speeds and the power outputs of the first stage 424 of the high pressure turbine 420 and the second stage 426 of the high pressure turbine 420, which drive the high pressure compressor 416 and the low pressure compressor 415, and the first motor-generator 460 (connected to the high pressure compressor spool 434), the second motor-generator 462 (connected to the high pressure turbine second stage spool 432) and the third motor-generator 461 (connected to the low speed spool 428 and to the high pressure turbine second stage spool 432). The customization of speeds also applies to the high pressure turbine second stage spool 432 and the low speed spool 428 to improve the design efficiency of the third motor-generator 461. The foregoing also enables enhanced load sharing between the high pressure turbine first stage spool 430, the high pressure turbine second stage spool 432 and the low speed spool 428, providing higher power outputs to the high pressure compressor spool 434 and the low speed spool 428, enabling faster spool up during transient operation. Additionally, in various embodiments and as illustrated and described, where the rotational speed of the low pressure compressor 415, $N_{LPC}$, is less than $N_{HPC}$, and the low pressure compressor 415 is not coupled to the fan 414 (e.g., through a shaft or fan drive gear system connected to the low pressure compressor 415), $N_{LPC}$ becomes independent of the rotational speed of the fan 414, $N_{FAN}$. This facilitates an increase in the pressure ratio across the low pressure compressor 415, leading to an increase in the overall pressure ratio across the compressor section 404, including both the low pressure compressor 415 and the high pressure compressor 416. In various embodiments, the benefits and advantages described herein are enhanced as the value of K becomes substantially greater than unity.

Figure 5:
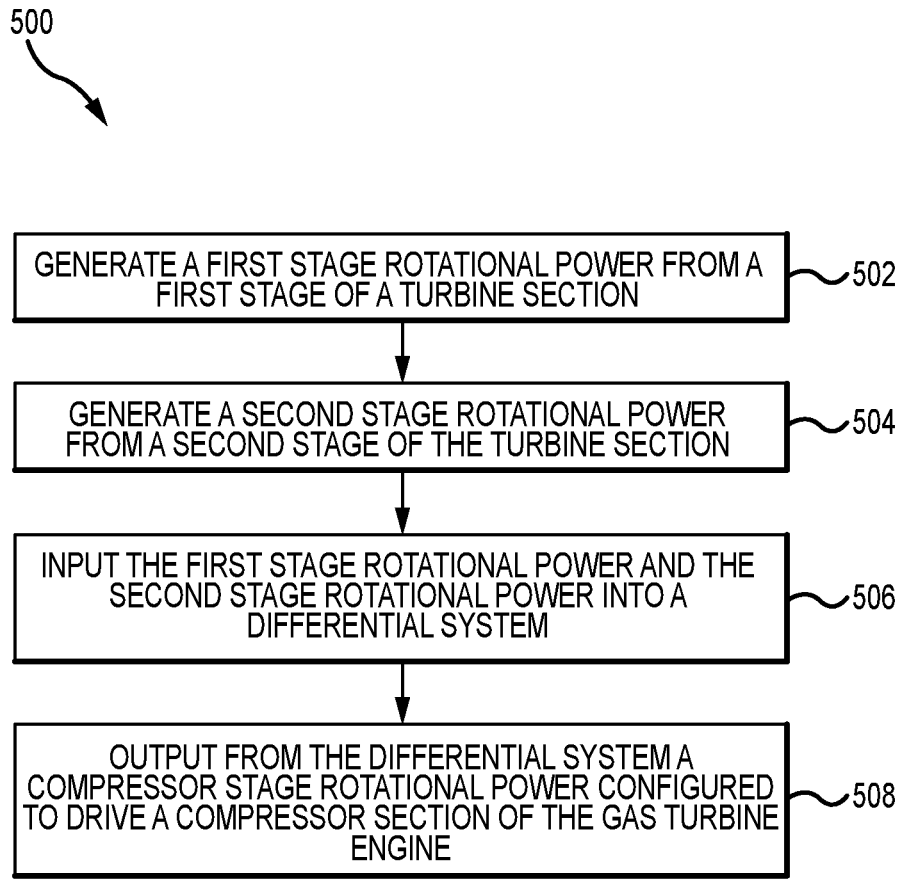
FIG. 5 describes various method steps for powering a high pressure compressor of a gas turbine engine, in accordance with various embodiments.

Referring now to FIG. 5, a method 500 for distributing power from a turbine section of a gas turbine engine (or, in various embodiments, a method of distributing power within a gas turbine engine) is described. In various embodiments, a first step 502 includes generating a first stage rotational power from a first stage of the turbine section. A second step 504 includes generating a second stage rotational power from a second stage of the turbine section. A third step 506 includes inputting the first stage rotational power and the second stage rotational power into a differential system, such as, for example, one of the differential system 140 described above with reference to FIGS. 1A and 1B or the differential system 240 described above with reference to FIGS. 2A and 2B, the differential system 340 described above with reference to FIGS. 3A and 3B or the differential system 440 described above with reference to FIGS. 4A and 4B. In various embodiments, inputting the first stage rotational power and the second stage rotational power into a differential system is performed via a first stage spool and a second stage spool, such as, for example, the high pressure turbine first stage spool 130 and the high pressure turbine second stage spool 132 described above with reference to FIGS. 1A and 1B, the high pressure turbine first stage spool 230 and the high pressure turbine second stage spool 232 described above with reference to FIGS. 2A and 2B, the high pressure turbine first stage spool 330 and the high pressure turbine second stage spool 332 described above with reference to FIGS. 3A and 3B and the high pressure turbine first stage spool 430 and the high pressure turbine second stage spool 432 described above with reference to FIGS. 4A and 4B. A fourth step 508 includes outputting from the differential system a compressor stage rotational power configured to drive a compressor section of the gas turbine engine. In various embodiments, the method 500 further includes driving a low pressure compressor of the compressor section via the second stage rotational power. In various embodiments, the method 500 further includes driving a fan via a low pressure turbine of the turbine section.

In various embodiments, the first stage rotational power from the first stage of the turbine section may be defined as the torque, τ, generated at a high pressure turbine first stage spool multiplied by the rotational speed, N, of the spool. For example, in various embodiments, the first stage rotational power may represent the product of the torque and the rotational speed of a high pressure turbine first stage spool, such as, for example, the high pressure turbine first stage spool 130 described above with reference to FIGS. 1A and 1B, the high pressure turbine first stage spool 230 described above with reference to FIGS. 2A and 2B, the high pressure turbine first stage spool 330 described above with reference to FIGS. 3A and 3B or the high pressure turbine first stage spool 430 described above with reference to FIGS. 4A and 4B (e.g., $P_{HPT1} = \tau_{HPT1} \times \pi/30 \times N_{HPT1}$). Similarly, the second stage rotational power from the second stage of the turbine section may be defined as the torque, τ, generated at a high pressure turbine second stage spool multiplied by the rotational speed, N, of the spool. For example, in various embodiments, the second stage rotational power may represent the product of the torque and the rotational speed of a high pressure turbine second stage spool, such as, for example, the high pressure turbine second stage spool 132 described above with reference to FIGS. 1A and 1B, the high pressure turbine second stage spool 232 described above with reference to FIGS. 2A and 2B, the high pressure turbine second stage spool 332 described above with reference to FIGS. 3A and 3B or the high pressure turbine second stage spool 432 described above with reference to FIGS. 4A and 4B (e.g., $P_{HPT2} = \tau_{HPT2} \times \pi/30 \times N_{HPT2}$). In addition, the compressor stage rotational power configured to drive the compressor section of the gas turbine engine may be defined as the torque, τ, input at a compressor section spool multiplied by the rotational speed, N, of the spool. For example, in various embodiments, the compressor stage rotational power may represent the product of the torque and the rotational speed of a high pressure compressor spool, such as, for example, the high pressure compressor spool 134 described above with reference to FIGS. 1A and 1B, the high pressure compressor spool 234 described above with reference to FIGS. 2A and 2B, the high pressure compressor spool 334 described above with reference to FIGS. 3A and 3B or the high pressure compressor spool 434 described above with reference to FIGS. 4A and 4B (e.g., $P_{HPC} = \tau_{HPC} \times \pi/30 \times N_{HPC}$). In the foregoing relations for power, the rotational speed of the spool, N, is typically provided in rotations per minute, with the factor $\pi/30$ used to convert the rotational speed to radians per second.

Figure 6B:
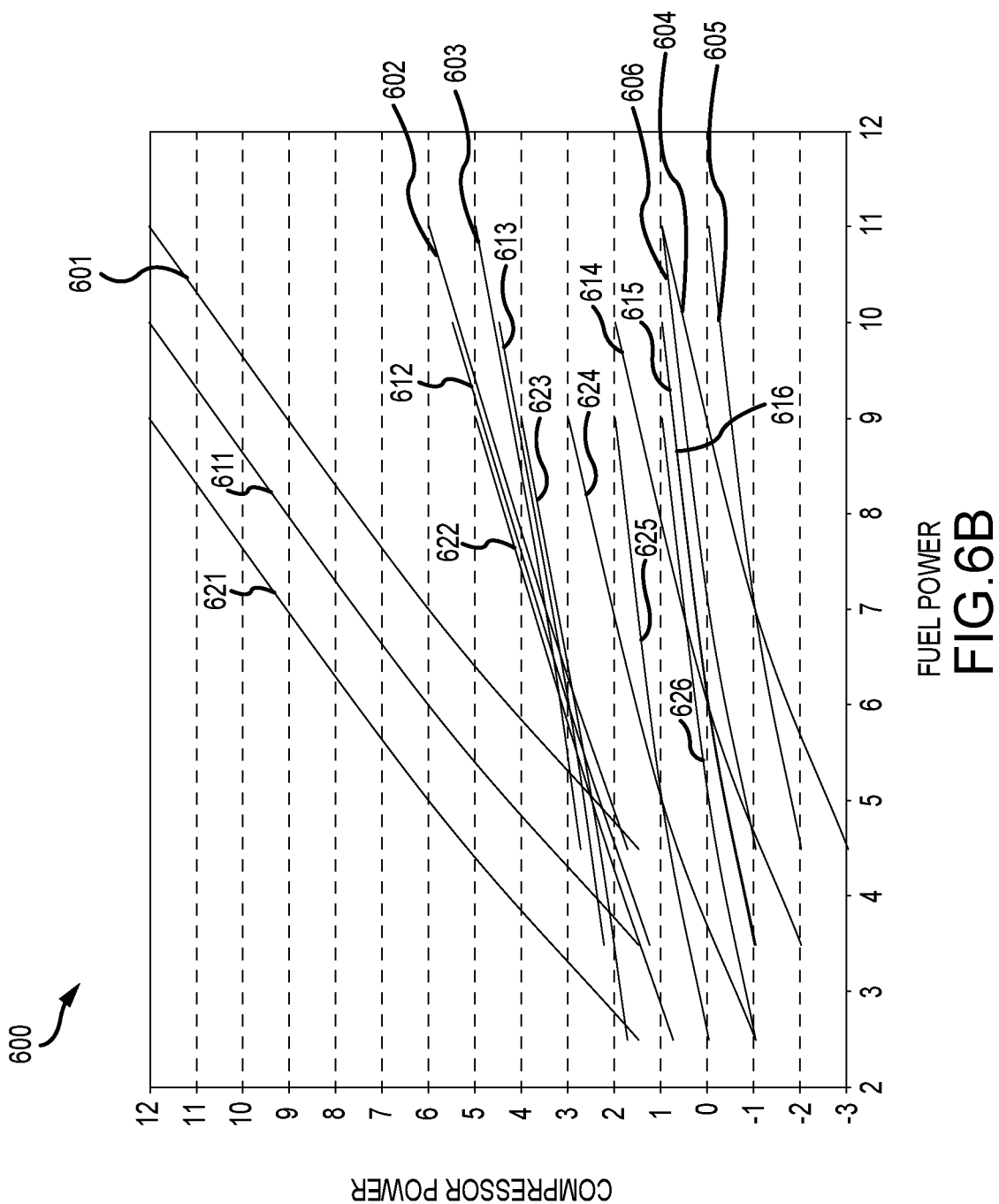

Referring now to FIGS. 6A and 6B, results and benefits of various embodiments are provided in the form of a graph 600 illustrating the mechanical power used to drive a high pressure compressor (y-axis) versus the thermal power required to drive a high pressure turbine (x-axis). The results provided in the graph 600 are consistent with operation of the gas turbine engine 100 described above with reference to FIGS. 1A and 1B, which includes the high pressure turbine first stage spool 130, the high pressure turbine second stage spool 132 and the high pressure compressor spool 134. With this configuration, the high pressure compressor spool 134 is driven primarily via the output of the differential system 140, though power to drive the high pressure compressor spool 134 may be supplemented by the first motor-generator 160 connected to the high pressure compressor spool 134 or the second motor-generator 162 connected to the high pressure turbine second stage spool 132, both of which are coupled to the energy storage device 172. Stated otherwise, in various embodiments, the high pressure compressor spool 134 is configured to receive an auxiliary input power (e.g., an electrical power) via the first motor-generator 160 connected to the high pressure compressor spool 134 (e.g., a first input power) or the second motor-generator 162 connected to the high pressure turbine second stage spool 132 (e.g., a second input power), both of which are coupled to the energy storage device 172. As indicated below, the auxiliary input power enables a reduced fuel power used to drive the high pressure turbine 120 via an exhaust stream from the combustor 118. When not providing or supplementing power to drive the high pressure compressor spool 134, the first motor-generator 160 or the second motor-generator 162 may be used to charge the energy storage device 172. Stated otherwise, when not providing or supplementing power to drive the high pressure compressor spool 134, the first motor-generator 160 or the second motor-generator 162 may be used to extract an auxiliary output power to charge the energy storage device 172, where the first motor-generator 160 is used to extract a first output power and the second motor-generator 162 is used to extract a second output power.

As illustrated in the graph 600, for this configuration, where K=1, the power and torque input to the differential system 140 by the high pressure turbine second stage spool 132 and the second motor-generator 162 is equal to the power and torque input to the differential system 140 by the high pressure turbine first stage spool 130. By way of example, plotted on the graph 600 are several core system power curves, including a compressor spool power curve 601, a first stage spool power curve 602, and a second stage spool power curve 603. Also plotted on the graph 600 are several auxiliary system power curves, including a total auxiliary power curve 604, a first motor-generator power curve 605 and a second motor-generator power curve 606. The units of power shown on the graph are dimensionless and intended to illustrate the overall power balance within the system at various loads required to drive the high pressure compressor spool 134 which, in turn, drives the high pressure compressor 116 illustrated in FIG. 1A.

For example, where the high pressure compressor spool 134 requires 12.0 units of power to drive the high pressure compressor 116 (which may be considered consistent with a takeoff phase of flight), the input fuel power, which represents the thermal energy of the exhaust exiting the combustor 118 and converted via the high pressure turbine 120 into rotational power at the high pressure turbine first stage spool 130 and the high pressure turbine second stage spool 132, is 11.0 units of power. The remaining 1.0 units of power required to drive the high pressure compressor spool 134 is provided by the second motor-generator 162 connected to the high pressure turbine second stage spool 132. This is illustrated in the graph 600 by the various power curves. Specifically, the compressor spool power curve 601 indicates 12.0 units of power, the first stage spool power curve 602 indicates 6.0 units of power, the second stage spool power curve 603 indicates 5.0 units of power and the total auxiliary power curve 604 indicates 1.0 units of power (the first motor-generator power curve 605 indicates 0.0 units of power and the second motor-generator power curve 606 indicates 1.0 units of power).

Still referring to FIG. 6A, where the high pressure compressor spool 134 requires 6.0 units of power to drive the high pressure compressor 116 (which may be considered consistent with a climb phase of flight), the input fuel power is 7.0 units of power. The excess 1.0 units of power required to drive the high pressure compressor spool 134 is used by the first motor-generator 160 connected to the high pressure compressor spool 134 to charge the energy storage device 172. This is illustrated in the graph 600 by the various power curves. Specifically, the compressor spool power curve 601 indicates 6.0 units of power, the first stage spool power curve 602 indicates 3.5 units of power, the second stage spool power curve 603 indicates 3.5 units of power and the total auxiliary power curve 604 indicates negative 1.0 units of power (the first motor-generator power curve 605 indicates –1.0 units of power and the second motor-generator power curve 606 indicates 0.0 units of power).

Similarly, where the high pressure compressor spool 134 requires 1.5 units of power to drive the high pressure compressor 116 (which may be considered consistent with a cruise phase of flight), the input fuel power is 4.5 units of power. The excess 3.0 units of power required to drive the high pressure compressor spool 134 is used by both the first motor-generator 160 connected to the high pressure compressor spool 134 and the second motor-generator 162 connected to the high pressure turbine second stage spool 132 to charge the energy storage device 172. This is illustrated in the graph 600 by the various power curves. Specifically, the compressor spool power curve 601 indicates 1.5 units of power, the first stage spool power curve 602 indicates 1.75 units of power, the second stage spool power curve 603 indicates 2.75 units of power and the total auxiliary power curve 604 indicates negative 3.0 units of power (the first motor-generator power curve 605 indicates –2.0 units of power and the second motor-generator power curve 606 indicates –1.0 units of power).

The foregoing data is provided for a configuration in which the energy storage device 172 may be represented as a baseline storage device having a baseline storage or utilization capacity which, for example, may be assumed equal to 3.0 units, with 1.0 units being used during the takeoff mode. Referring to FIG. 6B, the graph 600 is illustrated with the power curves for the baseline data just described, together with a second set of power curves for the energy storage device 172 having a utilization capacity of 2.0 units, with 3.0 units being used during the takeoff mode, and a third set of power curves for the storage device having a utilization capacity of 3.0 units, with 3.0 units being used during the takeoff mode. In various embodiments, the energy storage device 172 may be considered a battery having three cells, with each cell having a storage or usage capacity equal to 1.0 units. Similar to the foregoing, the second set of power curves (and the third set of power curves) will include a compressor spool power curve 611 (and 621), a first stage spool power curve 612 (and 622), a second stage spool power curve 613 (and 623), a total auxiliary power curve 614 (and 624), a first motor-generator power curve 615 (and 625) and a second motor-generator power curve 616 (and 626). The combined results for each of the three sets of power curves are summarized in the following table:

| | | | | K = 1 | | | |
|---|---|---|---|---|---|---|---|
| HPC | Fuel | 1$^{st}$ Spool | 2$^{nd}$ Spool | Total Aux | 1$^{st}$ M-G | 2$^{nd}$ M-G | Mode |
| | | | Utilization Capacity = 3.0 Units | | | | |
| 12.00 | 9.00 | 5.00 | 4.00 | 3.00 | 2.00 | 1.00 | Takeoff |
| 6.00 | 5.00 | 2.50 | 2.50 | 1.00 | 1.00 | 0.00 | Climb |
| 1.50 | 2.50 | 0.75 | 1.75 | −1.00 | 0.00 | −1.00 | Cruise |
| | | | Utilization Capacity = 2.0 Units | | | | |
| 12.00 | 10.0 | 5.50 | 4.50 | 2.00 | 1.00 | 1.00 | Takeoff |
| 6.00 | 6.00 | 3.00 | 3.00 | 0.00 | 0.00 | 0.00 | Climb |
| 1.50 | 3.50 | 1.25 | 2.25 | −2.00 | −1.00 | −1.00 | Cruise |
| | | | Utilization Capacity = 1.0 Units | | | | |
| 12.00 | 11.00 | 6.00 | 5.00 | 1.00 | 0.00 | 1.00 | Takeoff |
| 6.00 | 7.00 | 3.50 | 3.50 | −1.00 | −1.00 | 0.00 | Climb |
| 1.50 | 4.50 | 1.75 | 2.75 | −3.00 | −2.00 | −1.00 | Cruise |

Figure 7B:
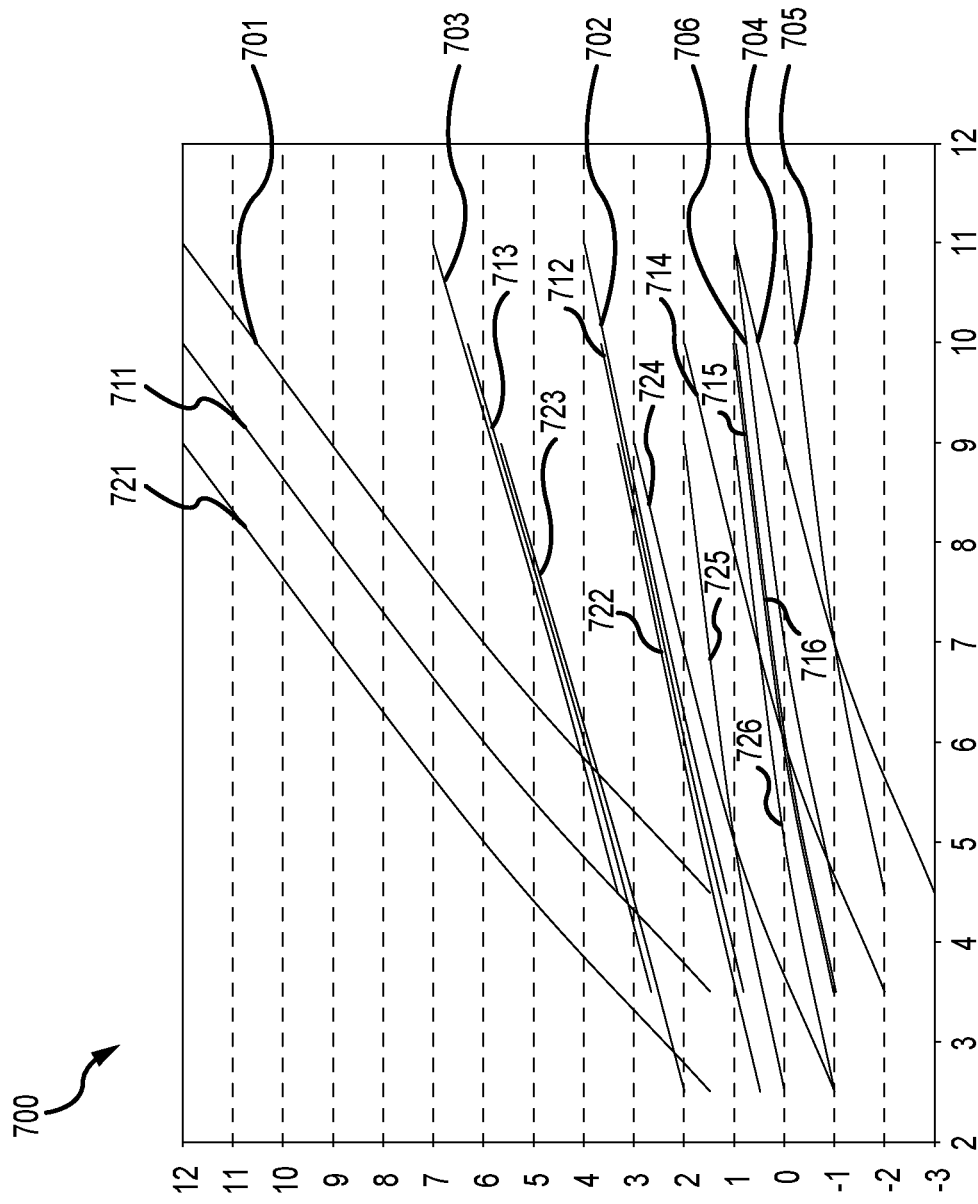

Referring now to FIGS. 7A and 7B, results and benefits of various embodiments are provided in the form of a graph 700 illustrating the mechanical power used to drive a high pressure compressor (y-axis) versus the thermal power required to drive a high pressure turbine (x-axis). The results provided in the graph 700 are consistent with operation of the gas turbine engine 300 described above with reference to FIGS. 3A and 3B, which includes the high pressure turbine first stage spool 330, the high pressure turbine second stage spool 332 and the high pressure compressor spool 334. With this configuration, the high pressure compressor spool 334 is driven primarily via the output of the differential system 340, though power to drive the high pressure compressor spool 334 may be supplemented by the first motor-generator 360 connected to the high pressure compressor spool 334 or the second motor-generator 362 connected to the high pressure turbine second stage spool 332, both of which are coupled to the energy storage device 372. Stated otherwise, in various embodiments, the high pressure compressor spool 334 is configured to receive an auxiliary input power (e.g., an electrical power) via the first motor-generator 360 connected to the high pressure compressor spool 334 (e.g., a first input power) or the second motor-generator 362 connected to the high pressure turbine second stage spool 332 (e.g., a second input power), both of which are coupled to the energy storage device 372. As indicated below, the auxiliary input power enables a reduced fuel power used to drive the high pressure turbine 320 via an exhaust stream from the combustor 318. When not providing or supplementing power to drive the high pressure compressor spool 334, the first motor-generator 360 or the second motor-generator 362 may be used to charge the energy storage device 372. Stated otherwise, when not providing or supplementing power to drive the high pressure compressor spool 334, the first motor-generator 360 or the second motor-generator 362 may be used to extract an auxiliary output power to charge the energy storage device 372, where the first motor-generator 360 is used to extract a first output power and the second motor-generator 362 is used to extract a second output power.

As illustrated in the graph 700, for this configuration, where K=2, the power and torque input to the differential system 340 by the high pressure turbine second stage spool 332 and the second motor-generator 362 is twice the power and torque input to the differential system 340 by the high pressure turbine first stage spool 330. By way of example, plotted on the graph 700 are several core system power curves, including a compressor spool power curve 701, a first stage spool power curve 702, and a second stage spool power curve 703. Also plotted on the graph 700 are several auxiliary system power curves, including a total auxiliary power curve 704, a first motor-generator power curve 705 and a second motor-generator power curve 706. The units of power shown on the graph are dimensionless and intended to illustrate the overall power balance within the system at various loads required to drive the high pressure compressor spool 334 which, in turn, drives the high pressure compressor 316 illustrated in FIG. 3A.

For example, where the high pressure compressor spool 334 requires 12.0 units of power to drive the high pressure compressor 316 (which may be considered consistent with a takeoff phase of flight), the input fuel power, which represents the thermal energy of the exhaust exiting the combustor 318 and converted via the high pressure turbine 320 into rotational power at the high pressure turbine first stage spool 330 and the high pressure turbine second stage spool 332, is 11.0 units of power. The remaining 1.0 units of power required to drive the high pressure compressor spool 334 is provided by the second motor-generator 362 connected to the high pressure turbine second stage spool 332. This is illustrated in the graph 700 by the various power curves. Specifically, the compressor spool power curve 701 indicates 12.0 units of power, the first stage spool power curve 702 indicates 4.0 units of power, the second stage spool power curve 703 indicates 7.0 units of power and the total auxiliary power curve 704 indicates 1.0 units of power (the first motor-generator power curve 705 indicates 0.0 units of power and the second motor-generator power curve 706 indicates 1.0 units of power).

Still referring to FIG. 7A, where the high pressure compressor spool 334 requires 6.0 units of power to drive the high pressure compressor 316 (which may be considered consistent with a climb phase of flight), the input fuel power is 7.0 units of power. The excess 1.0 units of power required to drive the high pressure compressor spool 334 is used by the first motor-generator 360 connected to the high pressure compressor spool 334 to charge the energy storage device 372. This is illustrated in the graph 700 by the various power curves. Specifically, the compressor spool power curve 701 indicates 6.0 units of power, the first stage spool power curve 702 indicates 2.333 units of power, the second stage spool power curve 703 indicates 4.667 units of power and the total auxiliary power curve 704 indicates negative 1.0 units of power (the first motor-generator power curve 705 indicates −1.0 units of power and the second motor-generator power curve 706 indicates 0.0 units of power).

Similarly, where the high pressure compressor spool 334 requires 1.5 units of power to drive the high pressure compressor 316 (which may be considered consistent with a cruise phase of flight), the input fuel power is 4.5 units of power. The excess 3.0 units of power required to drive the high pressure compressor spool 334 is used by both the first motor-generator 360 connected to the high pressure compressor spool 334 and the second motor-generator 362 connected to the high pressure turbine second stage spool 332 to charge the energy storage device 372. This is illustrated in the graph 700 by the various power curves. Specifically, the compressor spool power curve 701 indicates 1.5 units of power, the first stage spool power curve 702 indicates 1.167 units of power, the second stage spool power curve 703 indicates 3.333 units of power and the total auxiliary power curve 704 indicates negative 3.0 units of power (the first motor-generator power curve 705 indicates −2.0 units of power and the second motor-generator power curve 706 indicates −1.0 units of power).

The foregoing data is provided for a configuration in which the energy storage device 372 may be represented as a baseline storage device having a baseline storage or utilization capacity which, for example, may be assumed equal to 3.0 units, with 1.0 units being used during the takeoff mode. Referring to FIG. 7B, the graph 700 is illustrated with the power curves for the baseline data just described, together with a second set of power curves for the energy storage device 372 having a utilization capacity of 2.0 units, with 2.0 units being used during the takeoff mode, and a third set of power curves for the storage device having a utilization capacity of 3.0 units, with 3.0 units being used during the takeoff mode. In various embodiments, the energy storage device 372 may be considered a battery having three cells, with each cell having a storage or usage capacity equal to 1.0 units. Similar to the foregoing, the second set of power curves (and the third set of power curves) will include a compressor spool power curve 711 (and 721), a first stage spool power curve 712 (and 722), a second stage spool power curve 713 (and 723), a total auxiliary power curve 714 (and 724), a first motor-generator power curve 715 (and 725) and a second motor-generator power curve 716 (and 726). The combined results for each of the three sets of power curves are summarized in the following table:

| | | | K = 2 | | | | |
|---|---|---|---|---|---|---|---|
| HPC | Fuel | 1$^{st}$ Spool | 2$^{nd}$ Spool | Total Aux | 1$^{st}$ M-G | 2$^{nd}$ M-G | Mode |
| | | | Utilization Capacity = 3.0 Units | | | | |
| 12.00 | 9.00 | 3.333 | 5.667 | 3.00 | 2.00 | 1.00 | Takeoff |
| 6.00 | 5.00 | 1.667 | 3.333 | 1.00 | 1.00 | 0.00 | Climb |
| 1.50 | 2.50 | 0.500 | 2.000 | −1.00 | 0.00 | −1.00 | Cruise |
| | | | Utlization Capacity = 2.0 Units | | | | |
| 12.00 | 10.0 | 3.667 | 6.333 | 2.00 | 1.00 | 1.00 | Takeoff |
| 6.00 | 6.00 | 2.000 | 4.000 | 0.00 | 0.00 | 0.00 | Climb |
| 1.50 | 3.50 | 0.833 | 2.667 | −2.00 | −1.00 | −1.00 | Cruise |
| | | | Utilization Capacity = 1.0 Units | | | | |
| 12.00 | 11.00 | 4.000 | 7.000 | 1.00 | 0.00 | 1.00 | Takeoff |
| 6.00 | 7.00 | 2.333 | 4.667 | −1.00 | −1.00 | 0.00 | Climb |
| 1.50 | 4.50 | 1.167 | 3.333 | −3.00 | −2.00 | −1.00 | Cruise |

One or more benefits achieved through the above disclosure may be gleaned with further reference to the above tables. Referring to the table for K=1, for example, a fractional fuel savings is realized for the climb mode when auxiliary power is input to the high pressure compressor spool 134. For example, during the climb mode, 6.0 units of power is required to drive the high pressure compressor 116. When no auxiliary power is input to either the first motor-generator 160 connected to the high pressure compressor spool 134 or the second motor-generator 162 connected to the high pressure turbine second stage spool 132, the power from fuel required to drive the high pressure compressor 116 is also 6.0 units. However, when 1.0 units of power is input to the first motor-generator 160, the power from fuel required to drive the high pressure compressor 116 is reduced to 5.0 units, providing a fractional fuel savings of 16.667%. The change of power input by the first motor-generator 160 and the change of power extraction by the first motor-generator 160 is the same as the change in fuel power. In this mode of climb, switching from charging the energy storage device 172 at 1.0 units of power to discharging the energy storage device 172 at 1.0 units of power changes the required fuel power from 7.0 units of power to 5.0 units of power. This switching of power represents a fractional change of 2.0/7.0, or about a 28.6% reduction in fuel power required for the climb mode at constant 6.0 units of power to drive the high pressure compressor 116. The same fractional fuel savings is achieved for the case where K=2. However, note that in the K=2 case, the power required to drive the high pressure compressor spool 334 and the high pressure turbine second stage spool 332 is distributed such that 66.6% of the required power is input to the high pressure turbine second stage spool 332 and 33.3% of the required power is input to the high pressure compressor spool 334, whereas in the K=1 case, the power required to drive the high pressure compressor spool 134 and the high pressure turbine second stage spool 132 is evenly split such that 50.0% of the required power is input to the high pressure turbine second stage spool 132 and 50.0% of the required power is input to the high pressure compressor spool 134. The torque split differential and the first and second motor-generators, for both cases K=1 and K=2, enable a substantially stable inertia of the high pressure turbine second stage spool and a large increase of the high pressure turbine first stage spool and the high pressure compressor power during a wide range of engine maneuvers—e.g., from cruise to climb modes or from cruise or climb to takeoff (e.g., transient operation during flight) modes.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A method for distributing power from a high pressure turbine section of a gas turbine engine, comprising:
   generating a first stage rotational power from a first stage of the high pressure turbine section, the first stage connected to a high pressure turbine first stage spool;
   generating a second stage rotational power from a second stage of the high pressure turbine section, the second stage connected to a high pressure turbine second stage spool;
   inputting into a differential system having a first stage input gear connected to the high pressure turbine first stage spool and a second stage input gear connected to the high pressure turbine second stage spool, the first stage rotational power via the high pressure turbine first stage spool and the second stage rotational power via the high pressure turbine second stage spool;
   outputting from the differential system a compressor stage rotational power configured to drive a high pressure compressor spool of the gas turbine engine, the high pressure compressor spool connected to an output gear assembly; and
   selectively applying an auxiliary input power into at least one of the high pressure compressor spool, the high pressure turbine first stage spool, and the high pressure turbine second stage spool.

2. The method of claim 1, further comprising selectively extracting an auxiliary output power from at least one of the high pressure compressor spool, the high pressure turbine first stage spool and the high pressure turbine second stage spool.

3. The method of claim 2, further comprising driving a fan via a low pressure turbine of the gas turbine engine.

4. The method of claim 1, wherein the selectively applying the auxiliary input power includes applying a first input power to a first motor-generator connected to the high pressure compressor spool.

5. The method of claim 1, wherein the selectively applying the auxiliary input power includes applying a second input power to a second motor-generator connected to the high pressure turbine first stage spool.

6. The method of claim 1, wherein the selectively applying the auxiliary input power includes applying a first input power to a first motor-generator connected to the high pressure compressor spool and a second input power to a second motor-generator connected to the high pressure turbine second stage spool.

* * * * *